US00RE50612E

(19) United States
(12) Reissued Patent
Lewis et al.

(10) Patent Number: US RE50,612 E
(45) **Date of Reissued Patent: *Sep. 30, 2025**

(54) ILLUMINATION DEVICE AND METHOD FOR AVOIDING AN OVER-POWER OR OVER-CURRENT CONDITION IN A POWER CONVERTER

(71) Applicant: Lutron Technology Company LLC, Coopersburg, PA (US)

(72) Inventors: Jason Lewis, Driftwood, TX (US); Ryan Matthew Bocock, Austin, TX (US); Joseph Savage, Cedar Park, TX (US); Jivan James Luu, Austin, TX (US); David Knapp, Austin, TX (US)

(73) Assignee: Lutron Technology Company LLC, Coopersburg, PA (US)

( * ) Notice: This patent is subject to a terminal disclaimer.

(21) Appl. No.: 17/850,697

(22) Filed: Jun. 27, 2022

Related U.S. Patent Documents

Reissue of:
(64) Patent No.: 9,485,813
Issued: Nov. 1, 2016
Appl. No.: 14/604,870
Filed: Jan. 26, 2015

U.S. Applications:
(63) Continuation of application No. 16/178,185, filed on Nov. 1, 2018, now Pat. No. Re. 49,137, which is an application for the reissue of Pat. No. 9,485,813.

(51) Int. Cl.
*H05B 33/08* (2020.01)
*H05B 45/18* (2020.01)
(Continued)

(52) U.S. Cl.
CPC ..... *H05B 45/28* (2020.01); *H05B 45/18* (2020.01); *H05B 45/375* (2020.01); *H05B 45/44* (2020.01);
(Continued)

(58) Field of Classification Search
CPC ..... H05B 33/08; H05B 33/0809; H05B 33/0824; H05B 33/0829; H05B 33/0854; H05B 33/0872
(Continued)

(56) References Cited

U.S. PATENT DOCUMENTS 4,029,976 A 6/1977 Fish et al.
4,402,090 A 8/1983 Gfeller et al.
(Continued)

FOREIGN PATENT DOCUMENTS

CN 1291282 4/2001
CN 1291282 A 4/2001
(Continued)

OTHER PUBLICATIONS

"Color Management of a Red, Green, and Blue LED Combinational Light Source", Avago Technologies, Mar. 2010, 2 pages.
(Continued)

*Primary Examiner* — My Trang Ton
(74) *Attorney, Agent, or Firm* — Condo Roccia Koptiw LLP

(57) ABSTRACT

An illumination device and methods are provided herein for avoiding over-current and over-power conditions in one or more power converters included within the illumination device. The illumination device may include at least a plurality of light emitting diode (LED) chains, a driver circuit, at least one power converter, and a control circuit. In some embodiments, the control circuit may be generally configured for determining a maximum safe current level and/or a maximum safe power level attributed to the power converter(s) at a present operating temperature, and for adjusting respective drive currents supplied to the plurality of LED chains by the driver circuit, so as not to exceed the maximum safe current level or the maximum safe power level at the present operating temperature. In some embodi-
(Continued)

ments, a temperature sensor may be included within the illumination device for measuring the operating temperature presently associated with the power converter(s).

24 Claims, 10 Drawing Sheets

(51) Int. Cl.

| | |
|---|---|
| ***H05B 45/28*** | (2020.01) |
| ***H05B 45/375*** | (2020.01) |
| ***H05B 45/44*** | (2020.01) |
| ***H05B 45/56*** | (2020.01) |
| *H05B 45/12* | (2020.01) |
| *H05B 45/3725* | (2020.01) |

(52) U.S. Cl.
CPC ..... *H05B 45/56* (2020.01); *H05B 45/12* (2020.01); *H05B 45/3725* (2020.01)

(58) Field of Classification Search
USPC ..... 315/148–158
See application file for complete search history.

(56) References Cited

U.S. PATENT DOCUMENTS 4,713,841 A 12/1987 Porter et al.
4,745,402 A 5/1988 Auerbach
4,809,359 A 2/1989 Dockery
5,018,057 A 5/1991 Biggs et al.
5,103,466 A 4/1992 Bazes
5,181,015 A 1/1993 Marshall et al.
5,193,201 A 3/1993 Tymes
5,218,356 A 6/1993 Knapp
5,299,046 A 3/1994 Spaeth et al.
5,317,441 A 5/1994 Sidman
5,541,759 A 7/1996 Neff et al.
5,619,262 A 4/1997 Uno
5,657,145 A 8/1997 Smith
5,797,085 A 8/1998 Beuk et al.
5,905,445 A 5/1999 Gurney et al.
6,016,038 A 1/2000 Mueller et al.
6,067,595 A 5/2000 Lindenstruth
6,069,929 A 5/2000 Yabe et al.
6,084,231 A 7/2000 Popat
6,094,014 A 7/2000 Bucks et al.
6,094,340 A 7/2000 Min
6,108,114 A 8/2000 Gilliland et al.
6,127,783 A 10/2000 Pashley et al.
6,147,458 A 11/2000 Bucks et al.
6,150,774 A 11/2000 Mueller et al.
6,234,645 B1 5/2001 Borner et al.
6,234,648 B1 5/2001 Borner et al.
6,250,774 B1 6/2001 Begemann et al.
6,333,605 B1 12/2001 Grouev et al.
6,344,641 B1 2/2002 Blalock et al.
6,356,774 B1 3/2002 Bernstein et al.
6,359,712 B1 3/2002 Kamitani
6,384,545 B1 5/2002 Lau
6,396,815 B1 5/2002 Greaves et al.
6,414,661 B1 7/2002 Shen et al.
6,441,558 B1 8/2002 Muthu et al.
6,448,550 B1 9/2002 Nishimura
6,495,964 B1 12/2002 Muthu et al.
6,498,440 B2 12/2002 Stam et al.
6,513,949 B1 2/2003 Marshall et al.
6,577,512 B2 6/2003 Tripathi et al.
6,617,795 B2 9/2003 Bruning
6,636,003 B2 10/2003 Rahm et al.
6,639,574 B2 10/2003 Scheibe
6,664,744 B2 12/2003 Dietz
6,692,136 B2 2/2004 Marshall et al.
6,741,351 B2 5/2004 Marshall et al.
6,753,661 B2 6/2004 Muthu et al.
6,788,011 B2 9/2004 Mueller et al.
6,806,659 B1 10/2004 Mueller et al.
6,831,569 B2 12/2004 Wang et al.
6,831,626 B2 12/2004 Nakamura et al.
6,853,150 B2 2/2005 Clauberg et al.
6,879,263 B2 4/2005 Pederson et al.
6,965,205 B2 11/2005 Piepgras et al.
6,969,954 B2 11/2005 Lys
6,975,079 B2 12/2005 Lys et al.
6,982,528 B2 1/2006 Cottongim et al.
7,006,768 B1 2/2006 Franklin
7,014,336 B1 3/2006 Ducharme et al.
7,038,399 B2 5/2006 Lys et al.
7,046,160 B2 5/2006 Pederson et al.
7,072,587 B2 7/2006 Dietz et al.
7,088,031 B2 8/2006 Brantner et al.
7,119,500 B2 10/2006 Young
7,135,824 B2 11/2006 Lys et al.
7,161,311 B2 1/2007 Mueller et al.
7,166,966 B2 1/2007 Naugler, Jr. et al.
7,194,209 B1 3/2007 Robbins et al.
7,233,115 B2 6/2007 Lys
7,233,831 B2 6/2007 Blackwell
7,252,408 B2 8/2007 Mazzochette et al.
7,255,458 B2 8/2007 Ashdown
7,256,554 B2 8/2007 Lys
7,262,559 B2 8/2007 Tripathi et al.
7,294,816 B2 11/2007 Ng et al.
7,315,139 B1 1/2008 Selvan et al.
7,319,298 B2 1/2008 Jungwirth et al.
7,329,998 B2 2/2008 Jungwirth
7,330,002 B2 2/2008 Joung
7,330,662 B2 2/2008 Zimmerman
7,352,972 B2 4/2008 Franklin
7,358,706 B2 4/2008 Lys
7,359,640 B2 4/2008 Onde et al.
7,362,320 B2 4/2008 Payne et al.
7,372,859 B2 5/2008 Hall et al.
7,400,310 B2 7/2008 LeMay
7,436,131 B2 10/2008 Cottingim et al.
7,445,340 B2 11/2008 Conner et al.
7,511,695 B2 3/2009 Furukawa et al.
7,525,611 B2 4/2009 Zagar et al.
7,554,514 B2 6/2009 Nozawa
7,573,210 B2 8/2009 Ashdown et al.
7,583,901 B2 9/2009 Nakagawa et al.
7,606,451 B2 10/2009 Morita
7,607,798 B2 10/2009 Panotopoulos
7,619,193 B2 11/2009 Deurenberg
7,649,527 B2 1/2010 Cho et al.
7,659,672 B2 2/2010 Yang
7,675,250 B2 3/2010 Chitta et al.
7,683,864 B2 3/2010 Lee et al.
7,701,151 B2 4/2010 Petrucci et al.
7,737,936 B2 6/2010 Daly
7,828,479 B1 11/2010 Aslan et al.
7,911,156 B2 3/2011 Cottongim et al.
7,940,015 B2 5/2011 Chitta et al.
8,013,538 B2 9/2011 Zampini et al.
8,018,135 B2 9/2011 Van De Ven et al.
8,040,299 B2 10/2011 Kretz et al.
8,044,899 B2 10/2011 Ng et al.
8,044,918 B2 10/2011 Choi
8,057,072 B2 11/2011 Takenaka et al.
8,075,182 B2 12/2011 Dai et al.
8,076,869 B2 12/2011 Shatford et al.
8,159,150 B2 4/2012 Ashdown et al.
8,174,197 B2 5/2012 Ghanem et al.
8,174,205 B2 5/2012 Myers et al.
8,283,876 B2 10/2012 Ji
8,299,722 B2 10/2012 Melanson
8,362,707 B2 1/2013 Draper et al.
8,471,496 B2 6/2013 Knapp
8,521,035 B2 8/2013 Knapp et al.
8,556,438 B2 10/2013 McKenzie et al.
8,569,974 B2 10/2013 Chobot
8,595,748 B1 11/2013 Haggerty et al.
8,633,655 B2 1/2014 Kao et al.
8,653,758 B2 2/2014 Radermacher et al.

(56) References Cited

U.S. PATENT DOCUMENTS 8,680,787 B2 3/2014 Veskovic
8,704,666 B2 4/2014 Baker, Jr.
8,721,115 B2 5/2014 Ing et al.
8,748,172 B2 6/2014 Ferreira et al.
8,749,172 B2 6/2014 Knapp
8,773,032 B2 7/2014 May et al.
8,791,647 B2 7/2014 Kesterson et al.
8,816,600 B2 8/2014 Elder
8,911,160 B2 12/2014 Seo et al.
9,237,612 B1 1/2016 Lewis et al.
9,237,623 B1 1/2016 Lewis et al.
10,161,786 B2 12/2018 Chang et al.
2001/0020123 A1 9/2001 Diab et al.
2001/0030668 A1 10/2001 Erten et al.
2002/0014643 A1 2/2002 Kubo et al.
2002/0033981 A1 3/2002 Keller et al.
2002/0047624 A1 4/2002 Stam et al.
2002/0049933 A1 4/2002 Nyu
2002/0134908 A1 9/2002 Johnson
2002/0138850 A1 9/2002 Basil et al.
2002/0171608 A1 11/2002 Kanai et al.
2003/0103413 A1 6/2003 Jacobi, Jr. et al.
2003/0122749 A1 7/2003 Booth, Jr. et al.
2003/0133491 A1 7/2003 Shih
2003/0179721 A1 9/2003 Shurmantine et al.
2004/0044709 A1 3/2004 Cabrera et al.
2004/0052076 A1 3/2004 Mueller et al.
2004/0052299 A1 3/2004 Jay et al.
2004/0101312 A1 5/2004 Cabrera
2004/0136682 A1 7/2004 Watanabe
2004/0201793 A1 10/2004 Anandan et al.
2004/0220922 A1 11/2004 Lovison et al.
2004/0257311 A1 12/2004 Kanai et al.
2005/0004727 A1 1/2005 Remboski et al.
2005/0030203 A1 2/2005 Sharp et al.
2005/0030267 A1 2/2005 Tanghe et al.
2005/0053378 A1 3/2005 Stanchfield et al.
2005/0077838 A1 4/2005 Blumel
2005/0110777 A1 5/2005 Geaghan et al.
2005/0169643 A1 8/2005 Franklin
2005/0200292 A1 9/2005 Naugler, Jr. et al.
2005/0207157 A1 9/2005 Tani
2005/0242742 A1 11/2005 Cheang et al.
2005/0265731 A1 12/2005 Keum et al.
2006/0145887 A1 7/2006 McMahon
2006/0164291 A1 7/2006 Gunnarsson
2006/0198463 A1 9/2006 Godin
2006/0220990 A1 10/2006 Coushaine et al.
2006/0227085 A1 10/2006 Boldt, Jr. et al.
2007/0040512 A1 2/2007 Jungwirth et al.
2007/0109239 A1 5/2007 den Boer et al.
2007/0132592 A1 6/2007 Stewart et al.
2007/0139957 A1 6/2007 Haim et al.
2007/0248180 A1 10/2007 Bowman et al.
2007/0254694 A1 11/2007 Nakagwa et al.
2007/0279346 A1 12/2007 den Boer et al.
2008/0061717 A1 3/2008 Bogner et al.
2008/0107029 A1 5/2008 Hall et al.
2008/0120559 A1 5/2008 Yee
2008/0136334 A1 6/2008 Robinson et al.
2008/0136770 A1 6/2008 Peker et al.
2008/0136771 A1 6/2008 Chen et al.
2008/0150864 A1 6/2008 Bergquist
2008/0186898 A1 8/2008 Petite
2008/0222367 A1 9/2008 Co
2008/0235418 A1 9/2008 Werthen et al.
2008/0253766 A1 10/2008 Yu et al.
2008/0265799 A1 10/2008 Sibert
2008/0290804 A1* 11/2008 Santo ..... H05B 33/0854 215/158
2008/0297070 A1 12/2008 Kuenzler et al.
2008/0304833 A1 12/2008 Zheng
2008/0309255 A1 12/2008 Myers et al.
2008/0317475 A1 12/2008 Pederson et al.
2009/0026978 A1 1/2009 Robinson
2009/0040154 A1 2/2009 Scheibe
2009/0049295 A1 2/2009 Erickson et al.
2009/0051496 A1 2/2009 Pahlavan et al.
2009/0121238 A1 5/2009 Peck
2009/0171571 A1 7/2009 Son et al.
2009/0189530 A1* 7/2009 Ashdown ..... H05B 33/0818 315/152
2009/0196282 A1 8/2009 Fellman et al.
2009/0245101 A1 10/2009 Kwon et al.
2009/0278789 A1 11/2009 Declercq et al.
2009/0284511 A1 11/2009 Takasugi et al.
2009/0303972 A1 12/2009 Flammer, III et al.
2010/0005533 A1 1/2010 Shamir
2010/0054748 A1 3/2010 Sato
2010/0061734 A1 3/2010 Knapp
2010/0096447 A1 4/2010 Kwon et al.
2010/0134021 A1 6/2010 Ayres
2010/0134024 A1 6/2010 Brandes
2010/0141159 A1 6/2010 Shiu et al.
2010/0182294 A1 7/2010 Roshan et al.
2010/0188443 A1 7/2010 Lewis et al.
2010/0188972 A1 7/2010 Knapp
2010/0194299 A1 8/2010 Ye et al.
2010/0213856 A1 8/2010 Mizusako
2010/0272437 A1 10/2010 Yoon et al.
2010/0301777 A1 12/2010 Kraemer
2010/0327764 A1 12/2010 Knapp
2011/0031894 A1 2/2011 Van De Ven
2011/0044343 A1 2/2011 Sethuram et al.
2011/0052214 A1 3/2011 Shimada et al.
2011/0062874 A1 3/2011 Knapp
2011/0063214 A1 3/2011 Knapp
2011/0063268 A1 3/2011 Knapp
2011/0068699 A1 3/2011 Knapp
2011/0069094 A1 3/2011 Knapp
2011/0069960 A1 3/2011 Knapp et al.
2011/0133654 A1 6/2011 McKenzie et al.
2011/0148315 A1 6/2011 Van Der Veen et al.
2011/0150028 A1 6/2011 Nguyen et al.
2011/0248640 A1 10/2011 Welten
2011/0253915 A1 10/2011 Knapp
2011/0299854 A1 12/2011 Jonsson et al.
2011/0309754 A1 12/2011 Ashdown et al.
2012/0056545 A1 3/2012 Radermacher et al.
2012/0153839 A1 6/2012 Farley et al.
2012/0229032 A1 9/2012 Van De Ven et al.
2012/0299481 A1 11/2012 Stevens
2012/0306370 A1 12/2012 Van De Ven et al.
2012/0319604 A1* 12/2012 Walters ..... H02M 3/1582 315/200 R
2013/0016978 A1 1/2013 Son et al.
2013/0088522 A1 4/2013 Gettemy et al.
2013/0201690 A1 8/2013 Vissenberg et al.
2013/0257314 A1 10/2013 Alvord et al.
2013/0293147 A1 11/2013 Rogers et al.
2014/0028377 A1 1/2014 Rosik et al.
2015/0022110 A1 1/2015 Sisto

FOREIGN PATENT DOCUMENTS

CN 1396616 2/2003
CN 1396616 A 2/2003
CN 1573881 2/2005
CN 1573881 A 2/2005
CN 1650673 8/2005
CN 1650673 A 8/2005
CN 1849707 10/2006
CN 1849707 A 10/2006
CN 101083866 12/2007
CN 101083866 A 12/2007
CN 101150904 3/2008
CN 101150904 A 3/2008
CN 101331798 12/2008
CN 101331798 A 12/2008
CN 101458067 6/2009
CN 101458067 A 6/2009
EP 0196347 10/1986
EP 0196347 A1 10/1986
EP 0456462 11/1991

(56) References Cited

FOREIGN PATENT DOCUMENTS

| | | | |
|---|---|---|---|
| EP | 0456462 | A2 | 11/1991 |
| EP | 2273851 | | 1/2011 |
| EP | 2273851 | A2 | 1/2011 |
| GB | 2307577 | | 5/1997 |
| GB | 2307577 | A | 5/1997 |
| JP | 06-302384 | | 10/1994 |
| JP | H06302384 | A | 10/1994 |
| JP | 08-201472 | | 8/1996 |
| JP | H08201472 | A | 8/1996 |
| JP | 11-025822 | | 1/1999 |
| JP | H1125822 | A | 1/1999 |
| JP | 2001-514432 | | 9/2001 |
| JP | 2001514432 | A | 9/2001 |
| JP | 2004-325643 | | 11/2004 |
| JP | 2004325643 | A | 11/2004 |
| JP | 2005-539247 | | 12/2005 |
| JP | 2005539247 | A | 12/2005 |
| JP | 2006-260927 | | 9/2006 |
| JP | 2006260927 | A | 9/2006 |
| JP | 2007-266974 | | 10/2007 |
| JP | 2007-267037 | | 10/2007 |
| JP | 2007266974 | A | 10/2007 |
| JP | 2007267037 | A | 10/2007 |
| JP | 2008-507150 | | 3/2008 |
| JP | 2008507150 | A | 3/2008 |
| JP | 2008-300152 | | 12/2008 |
| JP | 2008300152 | A | 12/2008 |
| JP | 2009-134877 | | 6/2009 |
| JP | 2009134877 | A | 6/2009 |
| WO | 00/37904 | | 6/2000 |
| WO | 0037904 | A1 | 6/2000 |
| WO | 03/075617 | | 9/2003 |
| WO | 03075617 | A1 | 9/2003 |
| WO | 2005/024898 | | 3/2005 |
| WO | 2005024898 | A2 | 3/2005 |
| WO | 2007/069145 | | 6/2007 |
| WO | 2007069149 | A1 | 6/2007 |
| WO | 2008/065607 | | 6/2008 |
| WO | 2008065607 | A2 | 6/2008 |
| WO | 2008/129453 | | 10/2008 |
| WO | 2008129453 | A1 | 10/2008 |
| WO | 2010/124315 | | 11/2010 |
| WO | 2010124315 | A1 | 11/2010 |
| WO | 2012/005771 | | 1/2012 |
| WO | 2012005771 | A2 | 1/2012 |
| WO | 2012/042429 | | 4/2012 |
| WO | 2012042429 | A2 | 4/2012 |
| WO | 2013/142437 | | 9/2013 |
| WO | 2013142437 | A1 | 9/2013 |

OTHER PUBLICATIONS

"Final Office Action for U.S. Appl. No. 12/803,805 mailed Jun. 23, 2015", 75 pages.
"Final Office Action for U.S. Appl. No. 13/773,322, mailed on Sep. 2, 2015".
"Final Office Action mailed Jan. 28, 2015, for U.S. Appl. No. 12/806,117", 23 pages.
"Final Office Action mailed Jul. 9, 2013, for U.S. Appl. No. 12/806,118", 30 pages.
"Final Office Action mailed Jun. 14, 2013, for U.S. Appl. No. 12/806,117", 23 pages.
"Final Office Action mailed Jun. 18, 2014, for U.S. Appl. No. 13/231,077", 47 pages.
"Final Office Action mailed Nov. 28, 2011, for U.S. Appl. No. 12/360,467", 17 pages.
"Final Office Action Mailed Oct. 11, 2012, for U.S. Appl. No. 12/806,121", 24 pages.
"Final Office Action Mailed Sep. 12, 2012, for U.S. Appl. No. 12/584,143", 16 pages.
"International Search Report & Written Opinion for PCT/US2010/000219 mailed Oct. 12, 2010".
"International Search Report and Written Opinion for PCT/US2014/068556 mailed Jun. 22, 2015".
"International Search Report and Written Opinion for PCT/US2015/037660 mailed Oct. 28, 2015".
"LED Fundamentals, How to Read a Datasheet (Part 2 of 2) Characteristic Curves, Dimensions and Packaging", OSRAM Opto Semiconductors, Aug. 19, 2011, 17 pages.
"Notice of Allowance for U.S. Appl. No. 12/806,117 mailed Nov. 18, 2015", 18 pages.
"Notice of Allowance for U.S. Appl. No. 13/970,944 mailed Sep. 11, 2015", 10 pages.
"Notice of Allowance for U.S. Appl. No. 14/097,355 mailed Mar. 30, 2015", 9 pages.
"Notice of Allowance for U.S. Appl. No. 14/510,212 mailed May 22, 2015", 12 pages.
"Notice of Allowance for U.S. Appl. No. 14/510,243 mailed Nov. 6, 2015", 9 pages.
"Notice of Allowance for U.S. Appl. No. 14/604,881 mailed Oct. 9, 2015", 8 pages.
"Notice of Allowance for U.S. Appl. No. 14/604,886 mailed Sep. 25, 2015", 8 pages.
"Notice of Allowance mailed Aug. 21, 2014, for U.S. Appl. No. 12/584,143", 5 pages.
"Notice of Allowance mailed Feb. 21, 2014, for U.S. Appl. No. 12/806,118", 9 pages.
"Notice of Allowance mailed Feb. 25, 2013, for U.S. Appl. No. 12/806,121", 11 pages.
"Notice of Allowance mailed Feb. 4, 2013, for U.S. Appl. No. 12/806,113", 9 pages.
"Notice of Allowance mailed Jan. 20, 2012, for U.S. Appl. No. 12/360,467", 5 pages.
"Notice of Allowance mailed Jan. 28, 2014, for U.S. Appl. No. 13/178,686", 10 pages.
"Notice of Allowance mailed May 3, 2013, for U.S. Appl. No. 12/806,126", 6 pages.
"Notice of Allowance mailed Oct. 15, 2012, for U.S. Appl. No. 12/806,113", 8 pages.
"Notice of Allowance mailed Oct. 31, 2013, for U.S. Appl. No. 12/924,628", 10 pages.
"Office Action for JP Application 2012-523605 mailed Mar. 11, 2014".
"Office Action for JP Application 2012-523605 mailed Sep. 24, 2014".
"Office Action for U.S. Appl. No. 12/806,117 mailed May 27, 2015", 20 pages.
"Office Action for U.S. Appl. No. 13/970,964 mailed Jun. 29, 2015", 17 pages.
"Office Action for U.S. Appl. No. 13/970,990 mailed Aug. 20, 2015", 8 pages.
"Office Action for U.S. Appl. No. 14/305,456 mailed Apr. 8, 2015", 9 pages.
"Office Action for U.S. Appl. No. 14/305,472 mailed Mar. 25, 2015", 12 pages.
"Office Action for U.S. Appl. No. 14/510,243 mailed Jul. 28, 2015", 8 pages.
"Office Action for U.S. Appl. No. 14/510,266 mailed Jul. 31, 2015", 10 pages.
"Office Action for U.S. Appl. No. 14/510,283 mailed Jul. 29, 2015", 9 pages.
"Office Action for U.S. Appl. No. 14/573,207 mailed Nov. 4, 2015", 23 pages.
"Office Action mailed Apr. 22, 2014, for U.S. Appl. No. 12/806,114", 16 pages.
"Office Action Mailed Aug. 2, 2012, for U.S. Appl. No. 12/806,114", 14 pages.
"Office Action mailed Dec. 17, 2012, for U.S. Appl. No. 12/806,118", 29 pages.
"Office Action mailed Dec. 4, 2013, for U.S. Appl. No. 12/803,805", 19 pages.
"Office Action Mailed Feb. 1, 2012, for U.S. Appl. No. 12/584,143", 12 pages.
"Office Action mailed Jul. 10, 2012, for U.S. Appl. No. 12/806,113", 11 pages.

(56) References Cited

OTHER PUBLICATIONS

"Office Action Mailed Jul. 11, 2012, for U.S. Appl. No. 12/806,121", 23 pages.
"Office Action mailed Jun. 10, 2013, for U.S. Appl. No. 12/924,628", 9 pages.
"Office Action mailed Mar. 6, 2015, for U.S. Appl. No. 13/773,322", 30 pages.
"Office Action mailed May 12, 2011, for U.S. Appl. No. 12/360,467", 19 pages.
"Office Action mailed Nov. 12, 2013, for U.S. Appl. No. 13/231,077", 31 pages.
"Office Action Mailed Oct. 2, 2012, for U.S. Appl. No. 12/806,117", 22 pages.
"Office Action mailed Oct. 24, 2013, for U.S. Appl. No. 12/806,117", 19 pages.
"Office Action mailed Oct. 9, 2012, for U.S. Appl. No. 12/806,126", 6 pages.
"Office Action mailed Sep. 10, 2014, for U.S. Appl. No. 12/803,805", 28 pages.
"Partial International Search Report for PCT/US2014/068556 mailed Mar. 27, 2015".
Chonko, "Use Forward Voltage Drop to Measure Junction Temperature", 2013 Penton Media, Inc., 24 pages.
Johnson, "Visible Light Communication: Tutorial", Project IEEE P802.15 Working Group for Wireless Personal Area Networks (WPANs), Mar. 2008, 78 pages.
Kebemou, "A Partitioning-Centric Approach for the Modeling and the Methodical Design of Automotive Embedded System Architectures", Dissertation of Technical University of Berlin, 2008, 180 pages.
Final Office Action mailed Jan. 28, 2015 for U.S. Appl. No. 12/806,117.
Office Action mailed Mar. 6, 2015 for U.S. Appl. No. 13/773,322.
Office Action mailed Feb. 2, 2015 for CN Application 201080035731.X.
Office Action mailed Jul. 1, 2014 for JP Application 2012-520587.
Office Action mailed Feb. 17, 2015 for JP Application 2012-520587.
"Color Management of a Red, Green, and Blue LED Combinational Light Source," Avago Technologies, Mar. 2010, pp. 1-8.
Office Action mailed Mar. 11, 2014 for JP Application 2012-523605.
Office Action mailed Sep. 24, 2014 for JP Application 2012-523605.
Office Action mailed Mar. 25, 2015 for U.S. Appl. No. 14/305,472.
Notice of Allowance mailed Mar. 30, 2015 for U.S. Appl. 14/097,355.
Office Action mailed Apr. 8, 2015 for U.S. Appl. No. 14/305,456.
Office Action mailed May 27, 2015 for U.S. Appl. No. 12/806,117.
Partial International Search Report mailed Mar. 27, 2015 for PCT/US2014/068556.
Notice of Allowance mailed May 22, 2015 for U.S. Appl. No. 14/510,212.
"LED Fundamentals, How to Read a Datasheet, (Part 2 of 2) Characteristic Curves, Dimensions and Packaging," OSRAM Opto Semiconductors, Aug. 19, 2011.
International Search Report & Written Opinion for PCT/US2014/068556 mailed Jun. 22, 2015.
Final Office Action mailed Jun. 23, 2015 for U.S. Appl. No. 12/803,805.
Office Action mailed Jun. 29, 2015 for U.S. Appl. No. 13/970,964.
Office Action for U.S. Appl. No. 14/510,243 mailed Jul. 28, 2015.
Office Action for U.S. Appl. No. 14/510,283 mailed Jul. 29, 2015.
Office Action for U.S. Appl. No. 14/510,266 mailed Jul. 31, 2015.
Office Action for U.S. Appl. No. 13/970,990 mailed Aug. 20, 2015.
Partial International Search Report for PCT/US2015/037660 mailed Aug. 21, 2015.
Final Office Action for U.S. Appl. No. 13/773,322 mailed Sep. 2, 2015.
Notice of Allowance for U.S. Appl. No. 131970,944 mailed Sep. 11, 2015.
Bouchet et al., "Visible-light communication system enabling 73 Mb/s data streaming," IEEE Globecom Workshop on Optical Wireless Communications, 2010, pp. 1042-1046.
Notice of Allowance for U.S. Appl. No. 14/604,886 mailed Sep. 25, 2015.
Notice of Allowance for U.S. Appl. No. 14/604,881 mailed Oct. 9, 2015.
International Search Report & Written Opinion for PCT/US2015/037660 mailed Oct. 28, 2015.
Office Action for U.S. Appl. No. 14/573,207 mailed Nov. 4, 2015.
Notice of Allowance for U.S. Appl. No. 14/510,243 mailed Nov. 6, 2015.
Notice of Allowance for U.S. Appl. No. 12/806,117 mailed Nov. 18, 2015.
Partial International Search Report for PCT/US2015/045252 mailed Nov. 18, 2015.
Hall et al., "Jet Engine Control Using Ethernet with a BRAIN (Postprint)," AIAA/ASME/SAE/ASEE Joint Propulsion Conference and Exhibition, Jul. 2008, pp. 1-18.
Kebemou, "A Partitioning-Centric Approach for the Modeling and the Methodical Design of Automotive Embedded System Architectures," Dissertation of Technical University of Berlin, 2008, 176 pages.
O'Brien et al., "Visible Light Communications and Other Developments in Optical Wireless," Wireless World Research Forum, 2006, 26 pages.
Zalewski et al., "Safety Issues in Avionics and Automotive Databuses," IFAC World Congress, Jul. 2005, 6 pages.
"Visible Light Communication: Tutorial," Project IEEE P802.15 Working Group for Wireless Personal Area Networks (WPANs), Mar. 2008.
Johnson, "Visible Light Communications," CTC Tech Brief, Nov. 2009, 2 pages.
Chonko, "Use Forward Voltage Drop to Measure Junction Temperature," Dec. 2005, (c) 2013 Penton Media, Inc., 5 pages.
International Search Report & Written Opinion, PCT/US2010/000219, mailed Oct. 12, 2010.
International Search Report & Written Opinion, PCT/US2010/002171, mailed Nov. 24, 2010.
International Search Report & Written Opinion, PCT/US2010/004953, mailed Mar. 22, 2010.
International Search Report & Written Opinion, PCT/US2010/001919, mailed Feb. 24, 2011.
Office Action mailed May 12, 2011 for U.S. Appl. No. 12/360,467.
Final Office Action mailed Nov. 28, 2011 for U.S. Appl. No. 12/360,467.
Notice of Allowance mailed Jan. 20, 2012 for U.S. Appl. No. 12/360,467.
Office Action Mailed Feb. 1, 2012 for U.S. Appl. No. 12/584,143.
Final Office Action Mailed Sep. 12, 2012 for U.S. Appl. No. 12/584,143.
Office Action Mailed Aug. 2, 2012 for U.S. Appl. No. 12/806,114.
Office Action Mailed Oct. 2, 2012 for U.S. Appl. No. 12/806,117.
Office Action Mailed Jul. 11, 2012 for U.S. Appl. No. 12/806,121.
Final Office Action Mailed Oct. 11, 2012 for U.S. Appl. No. 12/806,121.
Office Action mailed Dec. 17, 2012 for U.S. Appl. No. 12/806,118.
Office Action mailed Oct. 9, 2012 for U.S. Appl. No. 12/806,126.
Office Action mailed Jul. 10, 2012 for U.S. Appl. No. 12/806,113.
Notice of Allowance mailed Oct. 15, 2012 for U.S. Appl. No. 12/806,113.
International Search Report & Written Opinion mailed Sep. 19, 2012 for PCT/US2012/045392.
Partial International Search Report mailed Nov. 16, 2012 for PCT/US2012/052774.
International Search Report & Written Opinion for PCT/US2012/052774 mailed Feb. 4, 2013.
Notice of Allowance mailed Feb. 4, 2013 for U.S. Appl. No. 12/806,113.
Notice of Allowance mailed Feb. 25, 2013 for U.S. Appl. No. 12/806,121.
Notice of Allowance mailed May 3, 2013 for U.S. Appl. No. 12/806,126.

(56) References Cited

OTHER PUBLICATIONS

International Search Report & Written Opinion, PCT/US2013/027157, May 16, 2013.
Office Action mailed Jun. 10, 2013 for U.S. Appl. No. 12/924,628.
Final Office Action mailed Jun. 14, 2013 for U.S. Appl. No. 12/806,117.
Office Action mailed Jun. 27, 2013 for U.S. Appl. No. 13/178,686.
Final Office Action mailed Jul. 9, 2013 for U.S. Appl. No. 12/806,118.
Office Action mailed Oct. 24, 2013 for U.S. Appl. No. 12/806,117.
Notice of Allowance mailed Oct. 31, 2013 for U.S. Appl. No. 12/924,628.
Office Action mailed Nov. 12, 2013 for U.S. Appl. No. 13/231,077.
Office Action mailed Dec. 4, 2013 for U.S. Appl. No. 12/803,805.
Office Action mailed Nov. 4, 2013 for CN Application No. 201080032373.7.
Notice of Allowance mailed Jan. 28, 2014 for U.S. Appl. No. 13/178,686.
Notice of Allowance mailed Feb. 21, 2014 for U.S. Appl. No. 12/806,118.
Office Action mailed Apr. 22, 2014 for U.S. Appl. No. 12/806,114.
Final Office Action mailed Jun. 18, 2014 for U.S. Appl. No. 13/231,077.
Office Action mailed Jun. 23, 2014 for U.S. Appl. No. 12/806,117.
Notice of Allowance mailed Aug. 21, 2014 for U.S. Appl. No. 12/584,143.
Office Action mailed Sep. 10, 2014 for U.S. Appl. No. 12/803,805.

* cited by examiner

ILLUMINATION DEVICE AND METHOD FOR AVOIDING AN OVER-POWER OR OVER-CURRENT CONDITION IN A POWER CONVERTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

[This application is related to commonly assigned U.S. patent application Ser. Nos. 14/314,451, which published on Dec. 31, 2015 as U.S. Patent Application Publication No. 2015/0377699; 14/314,530, which published on Dec. 31, 2015 as U.S. Patent Application Publication No. 2015/0382422; 14/314,580, which issued on Jul. 12, 2016 as U.S. Pat. No. 9,392,663; 14/471,057, which issued on Jul. 12, 2016 as U.S. Pat. No. 9,392,660; and 14/471,081, which published on Mar. 3, 2016 U.S. Patent Application Publication No. 2016/0066384.] *Notice: More than one reissue application has been filed for the reissue of U.S. Pat. No. 9,485,813. The reissue applications are the present application and U.S. patent application Ser. No. 16/178,185. The present application is a continuation reissue of U.S. patent application Ser. No. 16/178,185, filed Nov. 1, 2018, which is a reissue of U.S. Pat. No. 9,485,813, issued on Nov. 1, 2016, from U.S. patent application Ser. No. 14/604,870, which was filed Jan. 26, 2015.* The entirety of these applications is incorporated herein by reference.

BACKGROUND OF THE INVENTION

1. Field of the Invention

This invention relates to illumination devices comprising light emitting diodes (LEDs) and, more particularly, to illumination devices and methods for avoiding an over-power or over-current condition. Specifically, illumination devices and methods are provided herein for adjusting the drive currents supplied to the LED chains, so as not to exceed a maximum safe power level or a maximum safe current level attributed to one or more power converters included within the illumination device.

2. Description of the Relevant Art

The following descriptions and examples are provided as background only and are intended to reveal information that is believed to be of possible relevance to the present invention. No admission is necessarily intended, or should be construed, that any of the following information constitutes prior art impacting the patentable character of the subject matter claimed herein.

Lamps and displays using LEDs (light emitting diodes) for illumination are becoming increasingly popular in many different markets. LEDs provide a number of advantages over traditional light sources, such as incandescent and fluorescent light bulbs, including low power consumption, long lifetime, no hazardous materials, and additional specific advantages for different applications. When used for general illumination, LEDs provide the opportunity to adjust the color (e.g., from white, to blue, to green, etc.) or the color temperature (e.g., from "warm white" to "cool white") to produce different lighting effects.

In some cases, a number of differently colored emission LED chains may be combined into a single package, or emitter module, to provide a multi-colored LED illumination device. A multi-colored LED illumination device may be described as comprising two or more different colors of LED chains combined within an emitter module, typically to produce white or near-white light. Some multi-colored illumination devices may comprise only one emitter module, whereas others may include a plurality of emitter modules arranged, e.g., in a line or an array. There are many different types of white light illumination devices on the market, some of which combine red, green and blue (RGB) LED chains, red, green, blue and yellow (RGBY) LED chains, phosphor-converted white and red (WR) LED chains, RGBW LED chains, etc. within a single emitter module. By combining different colors of LED chains within the same emitter module, and driving the differently colored LED chains with different drive currents, these illumination devices may be configured to generate white or near-white light within a wide gamut of color set points or correlated color temperatures (CCTs) ranging from "warm white" (e.g., roughly 2600K-3700K), to "neutral white" (e.g., 3700K-5000K) to "cool white" (e.g., 5000K-8300K).

Some multi-colored LED illumination devices enable the brightness and/or color of the illumination to be changed to a particular set point. For example, some prior art illumination devices allow the target chromaticity or color set point to be changed by altering the ratio of drive currents supplied to the individual LED chains. As known in the art, the target chromaticity may be changed by adjusting the drive current levels (in current dimming) or duty cycle (in PWM dimming) supplied to one or more of the emission LED chains. For example, an illumination device comprising RGB LED chains may be configured to produce a "warmer" white light by increasing the drive current supplied to the red LEDs and decreasing the drive currents supplied to the blue and/or green LEDs.

Some prior art illumination devices also provide dimming capabilities, i.e., the ability to change the brightness level or target lumens output from the emission LEDs, in addition to (or instead of) color tuning. In most cases, the brightness level may be changed by adjusting the drive current levels (in current dimming) or the duty cycle of the drive currents (in PWM dimming) supplied to all emission LED chains to produce a new target lumens output. For example, the drive currents supplied to all emission LED chains may be increased to increase the target lumens output of the illumination device.

When the drive current supplied to a given LED is adjusted to change the brightness level or color set point of the illumination device, the junction temperature of that LED is inherently affected. As expected, higher drive currents result in higher junction temperatures, while lower drive currents result in lower junction temperatures. Below a certain junction temperature (e.g., about 25° C.), the lumen output of a given LED is generally unaffected by temperature. Beyond this temperature, however, the lumen output of an LED decreases significantly with increasing junction temperatures, thereby requiring higher drive currents to maintain the target lumens and target chromaticity settings of the illumination device. In some cases, the drive currents needed to maintain a certain target lumens and/or target chromaticity setting at a particular operating temperature may exceed a maximum current or power level, which can be safely provided by the power converters, which are included within the illumination device for supplying power to the LED chains.

As the brightness level and target chromaticity settings change, the power delivered to each LED chain by the power converters changes. At certain brightness levels and target chromaticity settings, the power drawn by the combined load (i.e., all LED chains combined) may exceed a maximum safe current or power level attributed to the power converters. This may cause the transformer core of one or more of the power converters to saturate, over-heat and possibly fail, unless counteractive measures are taken.

Some prior art illumination devices include power control circuitry for regulating LED power consumption or for protecting the LEDs from an over-voltage condition. For example, some devices may use current/voltage sensing and feedback to adjust the amount of power supplied to the LED chains by the power converter, and may use voltage clamps to protect the LEDs from electrical damage when the output voltage of the power converter exceeds a maximum value. However, the power control circuitry used in these devices does not protect the power converter from excessive current or power draws when the LEDs are operated at or near maximum operating levels.

A need remains for improved illumination devices and methods for limiting the amount of power drawn from the power converters of the illumination device, so as not to exceed a maximum safe current level or a maximum safe power level when brightness and/or target chromaticity settings are changed.

SUMMARY OF THE INVENTION

The following description of various embodiments of an illumination device and a method for controlling a lumen output of an illumination device is not to be construed in any way as limiting the subject matter of the appended claims.

According to one embodiment, an illumination device is provided herein comprising at least a plurality of light emitting diode (LED) chains, a driver circuit, at least one power converter, a temperature sensor and a control circuit. The LED chains are generally configured to produce illumination for the illumination device, and in particular, may produce illumination corresponding to desired lamp settings (e.g., a chromaticity setting, a brightness setting or a white mix setting) set within the illumination device. The driver circuit is coupled for generating and supplying a respective drive current to each of the plurality of LED chains, so as to achieve the desired lamp settings. The lamp settings may generally be changed, for example, by a user or building controller. In some embodiments, the illumination device may include an interface for receiving the desired lamp settings.

At least one power converter is coupled for supplying power to the driver circuit. Ideally, the at least one power converter may supply the amount of power required by the driver circuit to produce the respective drive currents needed to produce the illumination at the desired lamp settings. In some embodiments, the at least one power converter may comprise a first power converter (e.g., an AC/DC converter), which is coupled for supplying a DC voltage to a plurality of second power converters (e.g., a plurality of DC/DC converters), each of which are coupled for producing a forward voltage on a respective one of the LED chains. As described in more detail herein, the first power converter may have a maximum safe power level and the second power converters may each have a maximum safe current level, above which the inductive core of the power converters saturates, potentially causing the power converter to overheat and fail. The maximum safe power/current levels attributed to the power converters are not always consistent and tend to vary with operating temperature, once the operating temperature exceeds a predetermined safe temperature.

As lamp settings change, the drive currents supplied to the LED chains by the plurality of DC/DC converters change, which in turn, affects the operating temperature of the illumination device. At certain brightness and chromaticity settings, the drive current that should be supplied to a given LED chain to achieve the desired lamp settings may exceed a maximum safe current level attributed to a corresponding DC/DC converter at the present operating temperature, resulting in an "over-current condition." At other brightness and chromaticity settings, the total power drawn by all LED chains combined may exceed a maximum safe power level attributed to the AC/DC converter at the present operating temperature, resulting in an "over-power condition." In either case, an over-current or over-power condition may saturate the inductive core of the power converter, possibly causing the power converter to overheat and fail.

Improved illumination devices and methods are provided herein for limiting the load requirements placed on one or more power converters of the illumination device, so as not to exceed a maximum safe current/power level attributed to the power converters when lamp settings are changed. This need is particularly relevant to multi-colored LED illumination devices that provide dimming and/or color tuning capabilities, since changes in drive current inherently affect the lumen output, color and temperature of the illumination device, as well as the load requirements placed on the power converters. This need is also relevant to illumination devices with power converters rated with appropriate or reduced load ratings (i.e., not over-engineered to handle excessive loads), as such power converters are particularly susceptible to over-current and over-power conditions.

The improved illumination device and methods described herein avoid over-current and over-power conditions by including a control circuit, which is generally configured for determining the maximum safe current level and/or the maximum safe power level of the power converter(s) at a present operating temperature, and adjusting the respective drive currents supplied to the plurality of LED chains by the driver circuit, so as not to exceed the maximum safe current level or the maximum safe power level at the present operating temperature. In addition to a control circuit, a temperature sensor may be included for measuring the operating temperature presently associated with the power converter(s).

The method steps described herein are performed by several different components of the illumination device, such as the interface, the temperature sensor, the driver circuit and the control circuit. The method steps implemented by the control circuit may, in some embodiments, be performed by program instructions that are stored within a storage medium and executed by a processing device of the illumination device. Alternatively, the control circuit could comprise hardware logic for implementing the method steps.

In some embodiments, the control circuit and method may determine a maximum lumens value that can be safely produced by all LED chains at a predetermined safe temperature (e.g., 25° C.) to achieve a particular chromaticity setting. The chromaticity setting may be received by the interface or may be stored within the illumination device, and may be detected by the control circuit. In some embodiments, the control circuit and method may be configured for determining the maximum lumens value upon receiving the chromaticity setting, or only upon detecting a change in the chromaticity setting.

In some embodiments, the control circuit and method may determine the maximum lumens value by determining a lumen proportion, which is needed from each LED chain to achieve the chromaticity setting at the predetermined safe temperature. In some embodiments, the control circuit and method may determine the lumen proportions by determining, for each LED chain, chromaticity values that are expected for the LED chain using a forward voltage calibrated for the LED chain at the predetermined safe temperature, the respective drive current supplied to the LED chain by the driver circuit, a table of stored calibration values correlating forward voltage and drive current to chromaticity at a plurality of different temperatures, and one or more interpolation techniques. The control circuit and method may then use the expected chromaticity values to calculate the lumen proportions needed from each LED chain to achieve the chromaticity setting at the predetermined safe temperature.

Once the lumen proportions are determined, the control circuit and method may determine a relative lumens needed from each LED chain to achieve the lumen proportion determined for that LED chain, assuming only one of the plurality of LED chains is driven with a maximum drive current. For each LED chain, the control circuit and method may then calculate a ratio of the relative lumens determined for the LED chain over a maximum lumen output for that LED chain, and may determine an actual lumens needed from each LED chain to achieve the chromaticity setting at the predetermined safe temperature by dividing the relative lumens calculated for each LED chain by a largest of the calculated ratios. Finally, the control circuit and method may sum the actual lumens needed from each LED chain to determine the maximum lumens value that can be produced by all LED chains combined at the predetermined safe temperature to achieve the chromaticity setting.

In some embodiments, the control circuit and method may perform additional steps to determine the maximum lumens value. For example, the control circuit and method may determine a drive current, which is needed to produce the actual lumens needed from each LED chain to achieve the chromaticity setting at the predetermined safe temperature, and may further estimate a total power drawn by all LED chains combined at the predetermined safe temperature. The control circuit and method may also determine a maximum safe power level and a maximum safe current level for the power converters at the predetermined safe temperature. For the AC/DC converter, the control circuit and method may calculate a ratio of the maximum safe power level at the predetermined safe temperature over the total power estimated at the predetermined safe temperature. For each DC/DC converter, the control circuit and method may calculate a ratio of the maximum safe current level of the DC/DC converter at the predetermined safe temperature over the drive current determined for each corresponding LED chain at the predetermined safe temperature. A smallest of the calculated ratios may then be used to generate a scale factor, which can be applied to the maximum lumens value.

In some embodiments, the control circuit and method may determine a target lumens value that can be safely produced by all LED chains at the present operating temperature to achieve a particular chromaticity setting and a particular brightness setting without exceeding the maximum safe current level or the maximum safe power level associated with the at least one power converter. The chromaticity and brightness settings may be received by the interface or may be stored within the illumination device, and may be detected by the control circuit. In some embodiments, the control circuit and method may be configured for determining the target lumens value upon detecting the brightness setting, or only upon detecting a change in the brightness setting.

In some embodiments, the method steps described above for determining a maximum lumens value upon detecting a chromaticity setting (or a change in a chromaticity setting) may be performed before the method steps described below for determining a target lumens value. In other embodiments, the method steps described above for determining a maximum lumens value may be skipped if the chromaticity setting is not changed and a default or previously calculated maximum lumens value is assumed.

In some embodiments, the control circuit and method may determine the target lumens value by applying the brightness setting to the maximum lumens value to generate a temporary target lumens value, and thereafter, determining an actual lumens needed from each LED chain to achieve the temporary target lumens value at the present operating temperature.

In some embodiments, the control circuit and method may determine the actual lumens needed from each LED chain to achieve the temporary target lumens value at the present temperature by periodically turning the plurality of LED chains off for short durations of time, and measuring a forward voltage presently developed across each LED chain by applying a non-operative drive current to each LED chain, one chain at a time, during the short durations of time the plurality of LED chains are periodically turned off. In addition, the control circuit and method may be configured for determining chromaticity values that are expected for each LED chain using the forward voltage measured across each LED chain, the respective drive current supplied to each LED chain by the driver circuit, a table of stored calibration values correlating forward voltage and drive current to chromaticity at a plurality of different temperatures, and one or more interpolation techniques. Next, the control circuit and method may use the expected chromaticity values and the chromaticity setting to calculate the actual lumens needed from each LED chain to achieve the temporary target lumens value.

In some embodiments, the control circuit and method may perform additional steps to determine the target lumens value. For example, the control circuit and method may determine a drive current, which is needed for each LED chain to produce the actual lumens at the present operating temperature, and may further estimate a total power drawn by all LED chains combined at the present operating temperature. The control circuit and method may also determine the maximum safe power level and the maximum safe current level of the power converters at the present operating temperature, if this step was not previously performed. For the AC/DC converter, the control circuit and method may calculate a ratio of the maximum safe power level at the present operating temperature over the total power estimated at the present temperature. For each DC/DC converter, the control circuit and method may calculate a ratio of the maximum safe current level of the DC/DC converter at the present operating temperature over the drive current determined for each corresponding LED chain at the present temperature. A smallest of the calculated ratios may then be used to generate a scale factor. The target lumens value can then be calculated by applying the scale factor and the brightness setting to the maximum lumens value.

When operating temperatures are less than or equal to the predetermined safe temperature (e.g., 25° C.), the method described thus far provides a precise lumen output for the particular lamp settings (e.g., chromaticity, brightness and/or white mix settings) selected for the illumination device. Above the predetermined safe temperature, the scale factor applied to the target lumens value scales the lumen output with temperature, so as not to exceed the maximum safe power level or the maximum safe current level associated with the power converters at the present operating temperature. This avoids an "over-power" or "over-current" condition in the power converters, which improves lamp efficiency and prevents saturation of the inductive core.

In some embodiments, the control circuit and method may adjust the respective drive currents supplied to the plurality of LED chains by the driver circuit, so as to achieve the target lumens value. The illumination device may produce illumination at the new drive current levels, and the control circuit and method may continue to monitor for changes in lamp settings.

In other embodiments, one or more of the method steps described above may be repeated a predetermined number of times to minimize errors before the drive currents are adjusted. For example, as the scale factor reduces with increasing temperatures above 25° C., the target lumens value decreases, which improves LED efficiency and changes the relative drive currents between the LED chains. When this occurs, it may be beneficial to recalculate the chromaticity values that are expected for each LED chain at the new drive currents to provide a more accurate representation of the maximum lumens value.

The method steps described above are generally performed when the illumination device is first turned "on," and any time a change in lamp settings (e.g., chromaticity, brightness and/or white mix settings) is detected during normal operation of the illumination device. In some embodiments, additional steps may be used to fine tune the drive currents during operation of the illumination device when no changes in lamp settings are detected.

During normal operation, in which no changes are made to the lamp settings, it may be beneficial to continually or periodically update the scale factor applied to the target lumens value as operating temperatures change over time. For example, when drive currents increase, the operating temperature increases, which in turn, decreases the maximum safe power level and the maximum safe current level associated with the power converters. In order to avoid saturating the inductive core of the power converters, the control circuit and method may continually or periodically update the scale factor applied to the target lumens value to compensate for temperature related changes that occur, even when lamp settings remain the same.

In some embodiments, the control circuit and method may continually or periodically readjust the drive currents supplied to the LED chains to account for changes in the present operating temperature. This may be a achieved, in some embodiments, by measuring a new present temperature, determining an actual lumens needed from each LED chain to achieve the chromaticity setting and the target lumens value at the new present temperature, and determining a drive current that should be supplied to each LED chain to produce the actual lumens at the new present temperature. After the determined drive currents are applied to the LED chains, the control circuit and method may determine (not estimate) a total power drawn by all LED chains combined at the new present temperature, and may update the scale factor to account for changes in the maximum safe power level and/or the maximum safe current level of the power converters at the new present temperature. After the target lumens value is recalculated using the updated scale factor, the control circuit and method may adjust the respective drive currents supplied to the plurality of LED chains by the driver circuit, so as to achieve the recalculated target lumens value.

In some embodiments, the control circuit and method may update the scale factor by determining the maximum safe power level and the maximum safe current level of the power converters at the new present temperature. For the AC/DC converter, the control circuit and method may calculate a ratio of the maximum safe power level at the new present temperature over the total power determined at the new present temperature. For each of the DC/DC converters, the control circuit and method may calculate a ratio of the maximum safe current level at the new present temperature over the drive current determined for each LED chain. In some embodiments, the control circuit and method may subtract "1" from a smallest of the calculated ratios to generate a subtraction result, and may add the subtraction result to the scale factor to update the scale factor. In other embodiments, the control circuit and method may subtract "1" from a smallest of the calculated ratios to generate a subtraction result, multiply the subtraction result with a coefficient value to generate a multiplication result, and add the multiplication result to the scale factor to update the scale factor.

Depending on the brightness settings and operating temperature, the step of adding the subtraction (or multiplication result) to the scale factor to update the scale factor may cause the scale factor to gradually increase or decrease. As expected, increasing scale factor values increase the target lumens value, and thus, increase the drive currents supplied to the LED chains, the total power drawn by all LED chains, and eventually the operating temperature. Decreasing scale factor values have the opposite effect. By updating the scale factor value to account for changes in operating temperature over time, the control circuit and method ensures that the respective drive currents supplied to the LED chains will not cause an over-power or over-current condition in the power converters.

BRIEF DESCRIPTION OF THE DRAWINGS

Other objects and advantages of the invention will become apparent upon reading the following detailed description and upon reference to the accompanying drawings.

Figure 1:
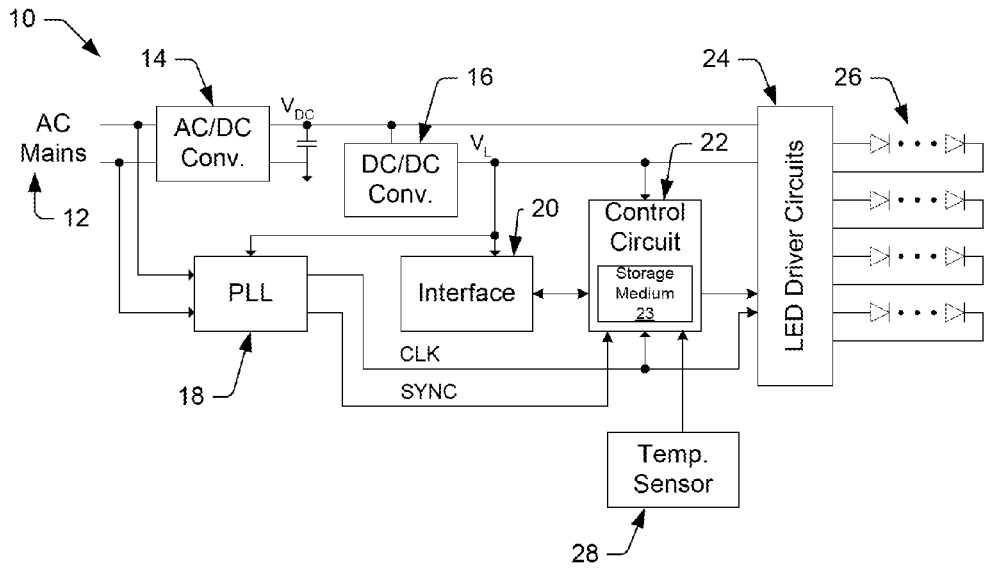
FIG. 1 is one example of a block diagram of an illumination device comprising at least one or more power converters, LED driver circuitry, control circuitry and a plurality of LED chains, according to one embodiment of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

An LED generally comprises a chip of semiconducting material doped with impurities to create a p-n junction. As in other diodes, current flows easily from the p-side, or anode, to the n-side, or cathode, but not in the reverse direction. Charge-carriers—electrons and holes—flow into the junction from electrodes with different voltages. When an electron meets a hole, it falls into a lower energy level, and releases energy in the form of a photon (i.e., light). The wavelength of the light emitted by the LED, and thus its color, depends on the band gap energy of the materials forming the p-n junction of the LED.

Red and yellow LEDs are commonly composed of materials (e.g., AlInGaP) having a relatively low band gap energy, and thus produce longer wavelengths of light. For example, most red and yellow LEDs have a peak wavelength in the range of approximately 610-650 nm and approximately 580-600 nm, respectively. On the other hand, green and blue LEDs are commonly composed of materials (e.g., GaN or InGaN) having a larger band gap energy, and thus, produce shorter wavelengths of light. For example, most green and blue LEDs have a peak wavelength in the range of approximately 515-550 nm and approximately 450-490 nm, respectively.

In some cases, a "white" LED may be formed by covering or coating, e.g., a blue LED having a peak emission wavelength of about 450-490 nm with a phosphor (e.g., YAG), which down-converts the photons emitted by the blue LED to a lower energy level, or a longer peak emission wavelength, such as about 525 nm to about 600 nm. In some cases, such an LED may be configured to produce substantially white light having a correlated color temperature (CCT) of about 3000K. However, a skilled artisan would understand how different colors of LEDs and/or different phosphors may be used to produce a "white" LED with a potentially different CCT.

When two or more differently colored LEDs are combined within a single package, the spectral content of the individual LEDs are combined to produce blended light. In some cases, differently colored LEDs may be combined to produce white or near-white light within a wide gamut of color points or CCTs ranging from "warm white" (e.g., roughly 2600K-3000K), to "neutral white" (e.g., 3000K-4000K) to "cool white" (e.g., 4000K-8300K). Examples of white light illumination devices include, but are not limited to, those that combine red, green and blue (RGB) LEDs, red, green, blue and yellow (RGBY) LEDs, white and red (WR) LEDs, and RGBW LEDs.

The present invention is generally directed to illumination devices having a plurality of light emitting diodes (LEDs) that are configured to provide illumination for the illumination device. For the sake of simplicity, the term "LED" or "emission LED" will be used throughout this disclosure to refer to a single LED, or a chain of serially connected LEDs supplied with the same drive current. Although not limited to such, the present invention is particularly well suited to illumination devices (i.e., multi-colored illumination devices) in which two or more different colors of emission LEDs are combined within a single package or emitter module to produce blended white or near-white light. The "color" of an LED is generally understood as referring to the peak emission wavelength of the light produced by the LED when forward biased. While examples of peak emission wavelengths for different colors of LEDs are provided above, the illumination device described herein is not limited to only the exemplary colors of LEDs mentioned herein and may comprise substantially any combination of LEDs.

The present invention is also particularly well suited to illumination devices (i.e., tunable illumination devices) that enable the target brightness level and/or the target chromaticity setting to be changed by adjusting the drive currents supplied to one or more of the emission LEDs. In addition to changing the lumen output and/or the color point setting of the illumination device, adjusting the drive currents supplied to one or more of the emission LEDs inherently affects the temperature of the illumination device and changes the load requirements placed on one or more power converters included within the illumination device. According to one embodiment, the present invention provides an improved illumination device and methods for limiting the amount of power drawn from the power converters of the illumination device, so as not to exceed a maximum safe current/power level when target brightness and/or target chromaticity settings are changed.

FIG. 1 illustrates an exemplary block diagram of an improved illumination device 10, according to one embodiment of the invention. The illumination device illustrated in FIG. 1 provides one example of the hardware and/or software that may be used to implement the methods shown in FIGS. 6-13 and described below.

In the illustrated embodiment, illumination device 10 comprises a plurality of emission LEDs 26, and in this example, comprises four chains of any number of serially connected LEDs. In typical embodiments, each chain may have 2 to 4 LEDs of the same color, which are coupled in series and configured to receive the same drive current. In one example, the emission LEDs 26 may include a chain of red LEDs, a chain of green LEDs, a chain of blue LEDs, and a chain of white or yellow LEDs. However, the present invention is not limited to any particular number of LED chains, any particular number of LEDs within each chain, or any particular color or combination of LED colors. In some embodiments, the emission LEDs 26 may be mounted on a substrate and encapsulated within a primary optic structure of an emitter module, possibly along with one or more photodetectors (not shown in FIG. 1). In some embodiments, an illumination device may include more than one emitter module.

In addition to emission LEDs 26, illumination device 10 includes various hardware and software components for powering the illumination device and controlling the light output from the one or more emitter modules. In the embodiment shown in FIG. 1, illumination device 10 is connected to AC mains 12 and includes an AC/DC converter 14 for converting the AC mains voltage (e.g., 120V or 240V) to a DC voltage ($V_{DC}$). The DC voltage (e.g., 15V) is supplied to LED driver circuits 24 to produce the drive currents, which are supplied to the emission LEDs 26 for producing illumination. In the embodiment of FIG. 1, a DC/DC converter 16 is included for converting the DC voltage $V_{DC}$ (e.g., 15V) to a lower voltage $V_L$ (e.g., 3.3V), which is used to power the low voltage circuitry of the illumination device, such as PLL 18, interface 20, and control circuit 22. In other embodiments, illumination device 10 may be powered by a DC voltage source (e.g., a battery), instead of AC mains 12. In such embodiments, the illumination device may be coupled to the DC voltage source and may or may not include a DC/DC converter in place of the AC/DC converter 14. Additional timing circuitry may be needed to providing timing and synchronization signals to the control and driver circuits.

In the illustrated embodiment, a phase locked loop (PLL) 18 is included within illumination device 10 for providing timing and synchronization signals. Generally speaking, PLL 18 locks onto the AC mains frequency (e.g., 50 or 60 HZ) and produces a high speed clock (CLK) signal and a synchronization signal (SYNC). The CLK signal provides timing signals for control circuit 22 and LED driver circuits 24. In one example, the CLK signal frequency is in the tens of mHz range (e.g., 23 MHz), and is precisely synchronized to the AC Mains frequency and phase. The SNYC signal is used by the control circuit 22 to create the timing signals used to control the LED driver circuit 24. In one example, the SNYC signal frequency is equal to the AC Mains frequency (e.g., 50 or 60 HZ) and also has a precise phase alignment with the AC Mains.

In some embodiments, interface 120 may be included within illumination device 10 for receiving calibration data from an external calibration tool during manufacturing of the device. The calibration values received via interface 20 may be stored in a table of calibration values within storage medium 23 of control circuit 22, for example. Examples of calibration values that may be received via interface 20 include, but are not limited to, the luminous flux, intensity, wavelength, and chromaticity of the light emitted by each LED chain, as described in co-pending application Ser. Nos. 14/314,451 and 14/471,057. In some embodiments, efficiency values corresponding to one or more of power converters of the illumination device may also be received via interface 20 and stored within storage medium 23. If included, these efficiency values may be used to determine the maximum loads that may be placed on the power converters without saturating the transformer core.

Interface 20 is not limited to receiving calibration data and may be used, in some embodiments, for communicating information and commands to and from illumination device 10. During normal operation of illumination device 10, for example, interface 20 could be used to communicate commands used to control the illumination device, or to obtain information about the illumination device. For instance, commands may be communicated to illumination device 10 via interface 20 to turn the illumination device on/off, to control the brightness level and/or color set point of the illumination device, to initiate a calibration procedure, or to store calibration results in memory. In other examples, interface 20 may be used to obtain status information or fault condition codes associated with illumination device 10.

In some embodiments, interface 20 may comprise a wireless interface that is configured to operate according to ZigBee, WiFi, Bluetooth, or any other proprietary or standard wireless data communication protocol. In other embodiments, interface 20 could communicate optically using infrared (IR) light or visible light. Alternatively, interface 20 may comprise a wired interface, which is used to communicate information, data and/or commands over the AC mains 12 or a dedicated conductor, or a set of conductors. In another alternative embodiment, interface 20 may additionally or alternatively comprise a user interface, such as a display screen and/or one or more buttons, sliders, knobs or switches for controlling and/or diagnosing illumination device 10. A skilled artisan would recognize that a number of different interfaces may be included within the illumination device for communicating information, commands and control signals.

According to one preferred embodiment, interface 20 is coupled for receiving control signals from a building controller and/or from a user for altering an illumination state of illumination device 10. For example, interface 20 may receive control signals for turning the illumination device on/off, for changing a brightness level, or for changing a color point setting of the illumination device. In some embodiments, the brightness level may be adjusted substantially continuously between a minimum level (e.g., 0% brightness) and a maximum level (e.g., 100% brightness), according to a linear or logarithmic scale, by defining the brightness level as a 16-bit variable. In other embodiments, the brightness level may be adjusted between a limited number of predefined steps, wherein each step corresponds to a percent change in brightness (e.g., 0%, 25%, 50%, 75% or 100% maximum brightness) or a decibel change (e.g., +/−1 dB) in lumen output.

In some embodiments, the color point setting may be defined by a set of target chromaticity coordinates, such as x and y chromaticity values from the CIE 1931 Chromaticity Diagram, but is not limited to such. In some embodiments, the color point setting may be adjusted by selecting substantially any pair of x and y chromaticity values that fall with the color gamut producible by the combination of emission LEDs 26 included within the illumination device 10. In some embodiments, the x and y chromaticity values may each comprise 16-bit variables. If a white LED chain is included within illumination device 10, a 16-bit white mix variable may be combined with the 16-bit x and y chromaticity values to further define the color point setting.

As known in the art, the color gamut producible by a particular combination of emission LEDs 26 is defined by and constrained within the lines connecting the chromaticity coordinates of the emission LEDs. For example, a red (R) LED with a peak wavelength of 625 nm may have a chromaticity coordinate of (0.69, 0.31), a green (G) LED with a peak wavelength of 528 nm may have a chromaticity coordinate of (0.18, 0.73), and a blue (B) LED with a peak wavelength of 460 nm may have a chromaticity coordinate of (0.14, 0.04). When the chromaticity coordinates of the RGB LEDs are connected together, they form a triangle representing the color gamut producible by that particular combination of LEDs. With four different chains of LEDs (e.g., RGBW), there is an infinite number of different spectrums that can be combined to produce the same target chromaticity (x,y) within the color gamut triangle, since two different sets of three color LED chains can be used to produce the same target chromaticity. For example, magenta can be produced by the combination of RGB or RWB. The white mix variable defines the proportion of the total lumens produced by each color gamut triangle. For example, 100% white mix includes no green component, while 0% white mix contains no white.

Using the timing signals received from PLL 18 and the control signals from interface 20 (e.g., a desired brightness level and target chromaticity), control circuit 22 calculates and produces values indicating a desired drive current to be supplied to each of the LED chains 26. This information may be communicated from control circuit 22 to LED driver circuits 24 over a serial bus conforming to a standard, such as SPI or $I^2C$, for example. In addition, control circuit 22 may provide a latching signal that instructs the LED driver circuits 24 to simultaneously change the drive currents supplied to each of the LED chains 26 to prevent brightness and color artifacts.

In some embodiments, control circuit 22 may be configured for determining the respective drive currents needed to achieve a desired luminous flux and/or a desired chromaticity for the illumination device in accordance with one or more of the compensation methods described in co-pending application Ser. Nos. 14/314,530; 14/314,580; and 14/471,081, which are commonly assigned and incorporated herein in their entirety. In a preferred embodiment, control circuit 22 may be further configured for adjusting the drive currents supplied to the emission LEDs 26, so as not to exceed a maximum safe current level or a maximum safe power level attributed to one or more power converters of the illumination device 10 at a present operating temperature.

As shown in FIG. 1, a temperature sensor 28 may be included within the illumination device 10 for measuring a present operating temperature of the illumination device. In some embodiments, temperature sensor 28 may be a thermistor, which is thermally coupled to a circuit board or chip comprising one or more of the components shown in FIG. 1. For example, temperature sensor 28 may be coupled to a circuit board comprising AC/DC converter 14, DC/DC converter 16, PLL 18 and interface 20. In another example, temperature sensor 28 may be thermally coupled to the chip comprising LED driver circuits 24 and emission LED chains 26. In other embodiments, temperature sensor 28 may be an LED, which is used as both a temperature sensor and an optical sensor to measure ambient light conditions or output characteristics of LED chains 26. The temperature measured by the sensor 28 is supplied to the control circuit 22 for adjusting the drive currents.

In some embodiments, control circuit 22 may determine the respective drive currents by executing program instructions stored within storage medium 23. In one embodiment, the storage medium may be a non-volatile memory, and may be configured for storing the program instructions along with a table of calibration values, as described for example in co-pending application Ser. Nos. 14/314,451 and 14/471,057. Alternatively, control circuit 22 may include combinatorial logic for determining the desired drive currents, and storage medium 23 may only be used for storing the table of calibration values.

In general, LED driver circuits 24 may include a number (N) of driver blocks 30 equal to the number of emission LED chains 26 included within the illumination device 10. In one exemplary embodiment, LED driver circuits 24 comprise four driver blocks 30, each configured to produce illumination from a different one of the emission LED chains 26. In some embodiments, LED driver circuits 24 may comprise circuitry for measuring ambient temperatures, measuring photodetector and/or emitter forward voltages and photocurrents, and adjusting the LED drive currents. Each driver block 30 receives data indicating a desired drive current from control circuit 22, along with a latching signal indicating when the driver block 30 should change the drive current.

Figure 2:
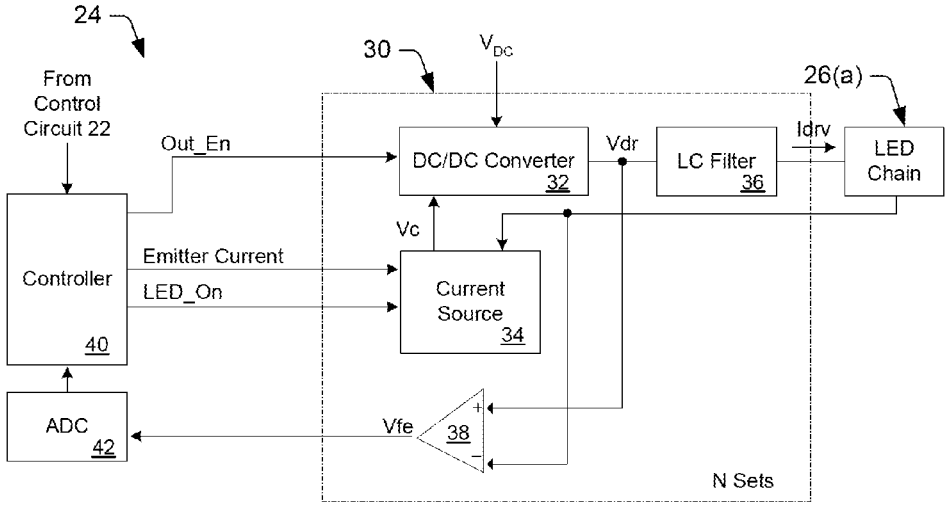
FIG. 2 is an exemplary block diagram of LED driver circuitry that may be included within the illumination device of FIG. 1.

FIG. 2 is an exemplary block diagram of LED driver circuits 24, according to one embodiment of the invention. In the exemplary embodiment of FIG. 2, LED driver circuits 24 include four driver blocks 30, each block including a DC/DC converter 32, a current source 34, and an LC filter 36 for generating the operative drive currents (Idrv) supplied to a connected chain of emission LEDs 26a to produce illumination, and the relatively small drive currents (Idrv) used to obtain emitter forward voltage (Vfe) measurements. In some embodiments, DC/DC converter 32 may convert the DC voltage ($V_{DC}$) into a pulse width modulated (PWM) voltage output (Vdr) when controller 40 drives the "Out_En" signal high. This PWM voltage signal (Vdr) is filtered by LC filter 36 to produce a forward voltage on the anode of the connected LED chain 26a. The cathode of the LED chain is connected to current source 34, which forces a fixed drive current (Idrv) equal to the value provided by the "Emitter Current" signal through LED chain 26a when the "Led_On" signal is high. The "Vc" signal from current source 34 provides feedback to the DC/DC converter 32 to output the proper duty cycle and minimize the voltage drop across current source 34.

As shown in FIG. 2, each driver block 30 may also include a difference amplifier 38 for measuring the forward voltage (Vfe) drop across the connected chain of emission LEDs 26a. When measuring Vfe, DC/DC converter 32 is turned off and current source 34 is configured for drawing a relatively small drive current (e.g., about 1 mA) through the connected chain of emission LEDs 26a. The forward voltage drop (Vfe) produced across LED chain 26a by that current is measured by the difference amplifier 38, which produces a signal equal to Vfe. The forward voltage (Vfe) is converted to a digital signal by analog to digital converter (ADC) 42 and supplied to controller 40. Controller 40 determines when to take forward voltage measurements and produces the Out_En, Emitter Current and Led_On signals, which are supplied to each of the driver blocks 30.

LED driver circuit 24 is not limited to the embodiment shown in FIG. 2. In some embodiments, each LED driver block 30 may include additional circuitry for measuring photocurrents, which are induced across one or more of the emission LED chains 26, when these chains are configured for detecting incident light (e.g., ambient light or light emitted from other emission LEDs). In some embodiments, LED driver circuit 24 may additionally include one or more receiver blocks (not shown) for measuring forward voltages and/or photocurrents induced across one or more photodetectors, which may also be included within the emitter module. In some embodiments, LED driver circuit 24 may include a temperature sensor for measuring a temperature of the driver circuitry and a multiplexer for multiplexing the emitter forward voltages (Vfe) and measured temperatures to the ADC 42. Exemplary embodiments of such a driver circuit are described in the previously mentioned co-pending applications.

DC/DC converter 16 and DC/DC converters 32 may include substantially any type of DC/DC power converter including, but not limited to, buck converters, boost converters, buck-boost converters, Ćuk converters, single-ended primary-inductor converters (SEPIC), or flyback converters. AC/DC converter 14 may likewise include substantially any type of AC/DC power converter including, but not limited to, buck converters, boost converters, buck-boost converters, Ćuk converters, single-ended primary-inductor converters (SEPIC), or flyback converters. Each of these power converters generally comprise a number of inductors (or transformers) for storing energy received from an input voltage source, a number of capacitors for supplying energy to a load, and a switch for controlling the energy transfer between the input voltage source and the load. The output voltage supplied to the load by the power converter may be greater than or less than the input voltage source, depending on the type of power converter used.

According to one preferred embodiment, AC/DC converter 14 comprises a flyback converter, while DC/DC converter 16 and DC/DC converters 32 comprise buck converters. AC/DC converter 14 converts the AC mains power (e.g., 120V or 240V) to a substantially lower DC voltage $V_{DC}$ (e.g., 15V), which is supplied to the buck converters 16/32. The buck converters 16/32 step down the DC voltage output from the AC/DC converter 14 to lower voltages, which are used to power the low voltage circuitry and provide drive currents to the LED chains 26.

As known in the art, each of the power converters 14/16/32 has a saturation current ($I_{sat}$) associated therewith, above which the inductive core saturates, potentially causing the power converter to overheat and fail. These saturation currents limit the maximum current that DC/DC converters 32 can safely deliver to the emission LED chains 26, and the maximum total power AC/DC converter 14 can safely draw from the AC mains power line 12 (or other input voltage source). These saturation currents are generally dependent on the magnetic flux density of the inductors or transformers used within the power converters, and in some embodiments, may range between about 30 mA and about 3 A for the AC/DC converter 14 and the DC/DC converters 32. In one embodiment, a typical saturation current may be about 1 A for both the AC/DC and DC/DC converters. The maximum safe power level provided by the AC/DC converter is generally defined as the saturation current ($I_{sat}$) times the AC mains voltage 12, and in one embodiment, may be approximately 18.5 W when drawn from a 120 Vrms AC power line. Assuming 80% efficiency, the AC/DC converter 14 may, in some cases, safely provide about 16 W to the load.

It is worth noting that the saturation currents may not always be the same for all power converters, and may be substantially different for one or more of the DC/DC converters. In one particular embodiment, the saturation current for the DC/DC converters 32 coupled to the red, green and white LED chains may be about 900 mA. However, since the smaller blue LEDs require less drive current, the DC/DC converter 32 coupled to the blue LED chain may exhibit a saturation current of about 400 mA. The maximum safe current level provided by the DC/DC converters is generally defined as the saturation current ($I_{sat}$) of that converter, and thus, may be about 900 mA for the DC/DC converters coupled to the red, green and white LED chains and about 400 mA for the DC/DC converter coupled to the blue LED chain, in one embodiment.

Figure 3:
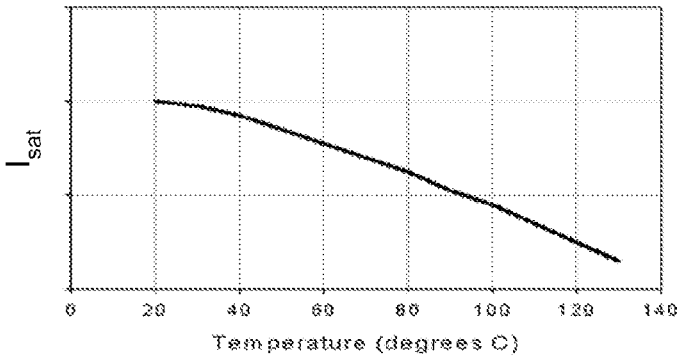
FIG. 3 is an exemplary graph illustrating how the saturation current ($I_{sat}$) of a power converter decreases with increasing temperatures above a predetermined safe temperature.

The saturation current of a power converter is affected by temperature and begins to decline above a certain temperature (e.g., 25° C.). As shown in FIG. 3, for example, the saturation current decreases roughly linearly with increasing temperatures above 25° C., and may sometimes decrease as much as 30-40% over a 25° C.-100° C. temperature range. This decreasing saturation current reduces the maximum safe current level associated with the DC/DC converters 32 and the maximum safe power level associated with the AC/DC converter 14. At 75° C., for example, the maximum safe power level of AC/DC converter 14 may only be about 15 W, and the maximum safe current level of DC/DC converters 32 may only be about 750 mA for the red, green and white LED chains and about 330 mA for the blue LED chain.

Figure 4:
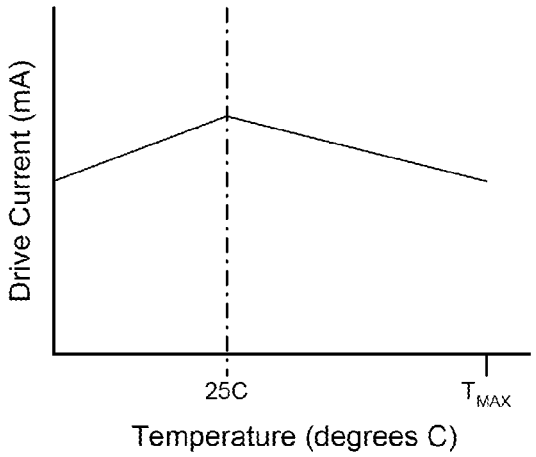
FIG. 4 is an exemplary graph illustrating how the drive current supplied to an LED chain decreases roughly linearly with increasing temperatures above a predetermined safe temperature, due to decreasing $I_{sat}$ in the power converter.
Figure 5:
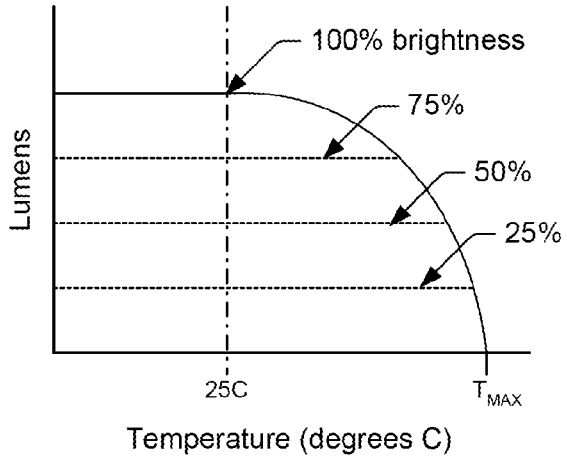
FIG. 5 is an exemplary graph illustrating how the lumen output of an LED chain decreases roughly with the square of temperature above a predetermined safe temperature, since both drive current and LED efficacy decrease with increasing temperature.

As known in the art, temperature also affects the drive currents supplied to the LED chains and the lumen output produced thereby. As shown in FIGS. 4-5, for example, increasing drive currents are typically needed to maintain a consistent lumen output from the LED chains up to a certain temperature (e.g., 25° C.). Above this temperature, decreasing saturation currents in the power converters limit the amount of drive current that can be supplied to the LED chains, which in turn, limits the lumen output. While drive current decreases roughly linearly with increasing temperatures above 25° C. (FIG. 4) due to decreasing $I_{sat}$ (FIG. 3), lumen output decreases roughly with the square of temperature (FIG. 5), since both drive current and LED efficacy decrease with increasing temperature. While temperature related changes in lumen output may not be noticeable at certain levels of brightness (e.g., 50% or less), a user would observe lumen output decreasing with increasing temperatures above 25° C. at higher levels of brightness (e.g., greater than 50%). If the brightness is set to full scale (100%), for example, the lumen output of the illumination device may decrease as much as 30-40% over the 25° C.-100° C. temperature range, and thus, would be very noticeable.

As the brightness level and color point setting of the illumination device 10 change, the drive currents individually supplied to the LED chains 26 by the DC/DC converters 32 change, which in turn, affects the temperature of the illumination device. At certain brightness levels and color point settings, the drive current that should be supplied to a given LED chain to achieve the desired settings may exceed a maximum safe current level attributed to a corresponding DC/DC converter 32 at the present operating temperature. For example, if the illumination device is configured to produce saturated green light at 100% brightness, the LED driver circuit 24 may be configured to supply approximately 900 mA of drive current to the green LED chain at 25° C. At 75° C., the maximum safe current attributed to the DC/DC converter 32 may only be 750 mA, which is less than the drive current that should be supplied to the green LED chain. Unless the drive current is reduced from 900 mA to 750 mA or below, an "over-current condition" results, causing the inductive core of the DC/DC converter 32 to saturate. At best, an "over-current condition" would significantly reduce the efficiency of the illumination device. At worst, such condition may cause the power converter to overheat and fail.

At other brightness levels and color point settings, the total power drawn by the combined load (i.e., all LED chains 26) could exceed a maximum safe power level attributed to the AC/DC converter 14. For example, if the illumination device were to include chains of RGBW LEDs, and all LED chains were driven with maximum drive currents (e.g., about 900 mA for the white, red and green chains and about 400 mA for the blue chain) to achieve 100% brightness and about 10K light, the white, red, green and blue emission LED chains could consume up to about 10 W, 8 W, 10 W and 5 W, respectively, which is more than twice the maximum power level (e.g., about 16 W) that can be safely drawn from AC/DC converter 14. This "over-power condition" would saturate the inductive core of the AC/DC converter 14, and most likely cause the power converter to overheat and fail.

Prior art illumination devices typically address this issue by over engineering the power converters, so that the user cannot specify brightness and color point settings that would result in an over-power or over-current condition. For instance, prior art illumination devices may use an AC/DC converter that provides up to about 40 W instead 16 W of maximum power, and may use inductors with saturation currents of 1 A at 100° C., instead of 1 A at 25° C. However, these power converters increase the cost of the illumination device, consume more space and generate more heat than the preferred embodiments of power converters disclosed herein.

A need remains for improved illumination devices and methods for limiting the load requirements placed on one or more power converters of the illumination device, so as not to exceed a maximum safe current/power level attributed to the power converters when brightness levels and/or color point settings are changed. This need is particularly relevant to multi-colored LED illumination devices that provide dimming and/or color tuning capabilities, since changes in drive current inherently affect the lumen output, color and temperature of the illumination device, as well as the load requirements placed on the power converters. This need is also relevant to illumination devices with power converters rated with reduced load ratings, as such power converters are particularly susceptible to over-current and over-power conditions.

In order to meet these needs, improved illumination devices and methods are provided herein for adjusting the drive currents supplied to the emission LEDs 26, so as not to exceed a maximum safe current level or a maximum safe power level attributed to one or more power converters of the illumination device at the present operating temperature. Specifically, improved illumination devices and methods are provided herein for determining a target lumens that can be safely provided by the illumination device at the present operating temperature, and for recalculating the target lumens in response to a change in brightness level, chromaticity setting and/or temperature.

FIGS. 6-13 illustrate various embodiments of methods for adjusting the drive currents supplied to one or more of the emission LED chains, so as not to exceed a maximum safe current level or a maximum safe power level attributed to one or more of the power converters at a present operating temperature. As described in more detail below, the method steps shown in FIGS. 6, 7A and 7B may be used to determine a maximum lumens value ("Max Lumens") that can be produced by all LED chains at a predetermined safe temperature (e.g., 25° C.) to achieve a particular target chromaticity ("Target Chromaticity") setting. These steps may be performed when the illumination device is first turned "on," and may be repeated whenever a change in the Target Chromaticity setting is detected.

In one embodiment, a "predetermined safe temperature" may be a typical ambient temperature. Although an exemplary safe temperature of 25° C. is used herein, a skilled artisan would understand how any temperature, which is within a normal operating range of the illumination device may alternatively be used.

Figure 6:
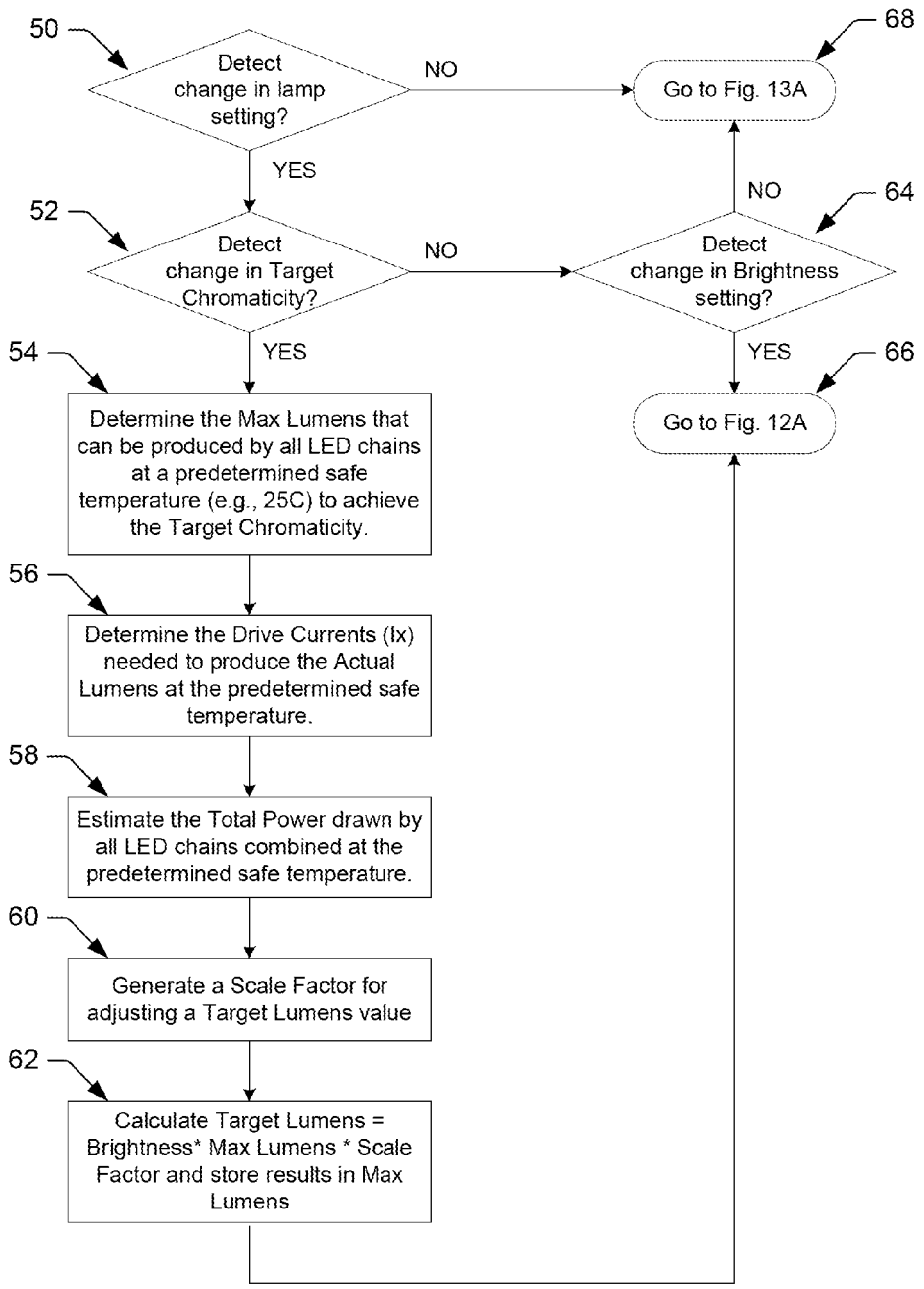
FIGS. 6, 7A, and 7B are flow chart diagrams illustrating exemplary methods used to determine a Max Lumens that can be produced by all LED chains at a predetermined safe temperature to achieve a particular target chromaticity setting.
Figure 11:
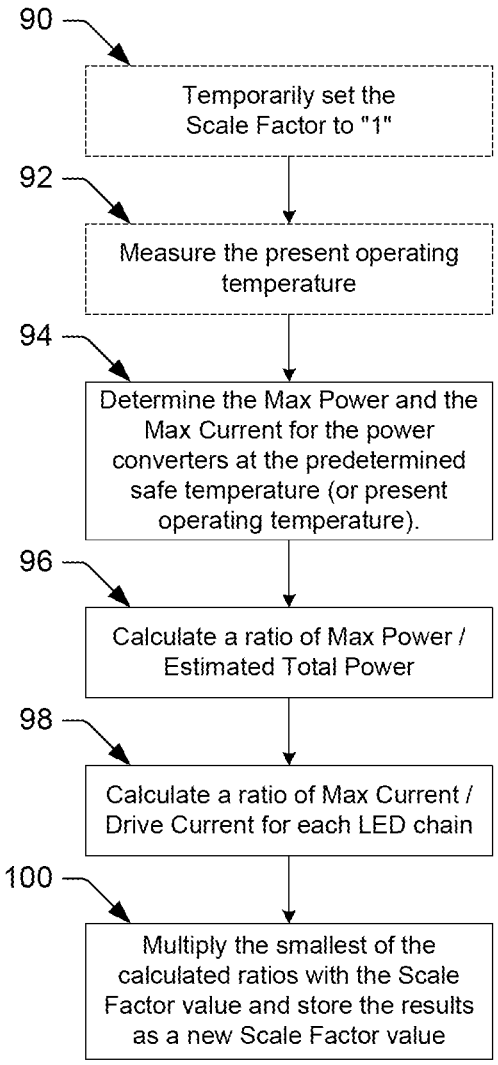
FIG. 11 is a flow chart diagram illustrating an exemplary method for determining a scale factor for adjusting the Target Lumens value determined in FIGS. 6 and 12A to ensure that the individual drive currents needed to achieve the target chromaticity setting and the total power drawn by all LED chains at the predetermined safe temperature do not exceed a maximum safe current level or a maximum safe power level of the power converters at a present operating temperature.

Method steps shown in FIGS. 6 and 11 may be used to determine a scale factor ("Scale Factor"), which can be used to adjust a target lumens ("Target Lumens") value to ensure that the individual drive currents ("Drive Currents") needed to achieve the Target Chromaticity setting and the total power ("Total Power") drawn by all LED chains at the predetermined safe temperature do not exceed a maximum safe current level ("Max Current") or a maximum safe power level ("Max Power") of the power converters at a present operating temperature. The method steps shown in FIGS. 12A and 12B may be used to adjust the Target Lumens value to account for changes in the brightness ("Brightness") setting and/or to adjust the Scale Factor to account for changes in brightness due to temperature changes. In most cases, the method steps shown in FIGS. 12A-12B may be performed after those shown in FIGS. 6, 7A and 7B. If no changes are made to either the Target Chromaticity or Brightness settings, the method steps shown in FIGS. 13A-13B may be used to continually or periodically update the Scale Factor to account for temperature related changes in the Drive Currents, Total Power, Max Current and Max Power.

The methods illustrated in FIGS. 6-13 may be utilized by an improved illumination device in accordance with the present invention, and may be performed by several different components included within such a device. In some embodiments, the method steps performed by the control circuit 22 may be implemented as program instructions, which are stored on a storage medium (e.g., storage medium 23) and executed on a processing device (included, e.g., within control circuit 22). In other embodiments, the control circuit may comprise hardware logic, or a combination of hardware logic and program instructions, for implementing the method steps described herein. In either embodiment, at least some of the method steps shown in FIGS. 6-13 are performed outside of a processing device by other components of the illumination device. For example, an operating temperature of the illumination device can be measured by a temperature sensor 28 included within the illumination device 10, and lamp settings can be set or changed through an interface 20 of the illumination device 10. Once a desired Target Lumens value is determined for a particular set of lamp settings at a present operating temperature, drive circuitry 24 within the illumination device 10 may be used to adjust the drive currents supplied to the respective LED chains to achieve the desired Target Lumens value.

The methods illustrated in FIGS. 6-13 assume that an illumination device employing such methods includes at least one emitter module comprising a plurality of emission LED chains, wherein at least one LED chain is configured for emitting a different peak wavelength (i.e., a different color of light) than the other LED chains. According to one embodiment, each emitter module may include a chain of red LEDs, a chain of green LEDs, a chain of blue LEDs and a chain of white LEDs, as discussed above. However, the methods described herein are not limited to any particular number or color of LED chains, and may be generally applied to an emitter module comprising at least two chains of differently colored LEDs (e.g., white and red LEDs, or white and blue LEDs).

The methods illustrated in FIGS. 6-13 also assume that the brightness level and color point setting of the illumination device can be changed. According to one embodiment, a 16-bit brightness variable may be supplied to the illumination device to set the brightness level, while a 16-bit x chromaticity variable, a 16-bit y chromaticity variable and a 16-bit white mix variable may be supplied to set the color point or target chromaticity of the illumination device. However, the methods described herein are not limited to 16-bit variables, nor are they limited to defining chromaticity values in terms of x and y coordinates. A skilled artisan would understand how the brightness level and color point setting of the illumination device may be alternatively defined without departing from the scope of the invention.

The methods illustrated in FIGS. 6-13 further assume that various electrical and optical characteristics of the emission LEDs were previously calibrated over a plurality of different drive currents and ambient temperatures during manufacturing of the illumination device, and that the calibration results were stored within a table of calibration values within a storage medium of the illumination device. According to one embodiment, an exemplary calibration table may include a plurality of luminous flux values, a plurality of x chromaticity values, a plurality of y chromaticity values and a plurality of emitter forward voltage values, which were previously obtained from each emission LED chain at a plurality of different drive currents (e.g., 10%, 30% and 100% of a max drive current) and at least two different ambient temperatures (e.g., T0 and T1). Exemplary calibration methods that may be used to obtain such calibration values are described, e.g., in co-pending application Ser. Nos. 14/314,451 and 14/471,057. In one example, the calibration values may be obtained at the predetermined safe temperature (e.g., T0=25° C.) associated with the power converters and also at a substantially higher temperature (e.g., T1=85° C.). However, the calibration values may be obtained at other ambient temperatures, as described further in the previously mentioned co-pending applications.

As shown in FIG. 6, embodiments of an improved method may generally begin when a change in one or more lamp settings is detected (in step 50). Examples of lamp settings that can be changed include, but are not limited to, turning the illumination device "on," or changing a brightness level or a color point setting of the illumination device. In FIG. 6, a change in lamp settings is detected (in step 50) whenever a change in the target chromaticity setting (step 52) and/or a change in the brightness level (step 64) is detected during operation of the illumination device (i.e., when the illumination device is "on"). As noted above, these settings may be changed by a building controller and/or by a user (via interface 20, for example) for altering an illumination state of the illumination device, and changes in such settings may be detected by control circuitry (e.g., control circuit 22, FIG. 1) included within the illumination device.

In some embodiments, a change in lamp settings may be detected (in step 50) when the illumination device is first turned "on," so that a Max Lumens value and a Scale Factor value may be initially calculated. In other embodiments, the method may reset the Scale Factor value to "1" and retrieve a previously calculated Max Lumens value from memory (e.g., storage medium 23, FIG. 1) when the illumination device is first turned "on." The previously calculated Max Lumens value retrieved from memory may be, for example, a Max Lumens value calculated for a default chromaticity setting or the last target chromaticity setting stored within the illumination device before the illumination device was turned "off."

If a change in target chromaticity is detected (in step 52), the method may determine or recalculate the maximum lumen value ("Max Lumens") produced by all LED chains to achieve the target chromaticity setting at the predetermined safe temperature (e.g., 25° C.) (in step 54). When driven with a maximum drive current, each LED chain produces a certain number of maximum lumens at 25° C. (otherwise referred to herein as a "maximum lumens output"). In one embodiment, the maximum lumens output produced by chains of four white, red, green and blue LEDs may be 1000 lumens, 250 lumens, 400 lumens, and 50 lumens, respectively, at 25° C. when each chain is driven with its maximum drive current. The maximum lumens output produced by each LED chain at the predetermined safe temperature may be stored within a storage medium of the illumination device and used to determine to determine the Max Lumens value that can be safely produced by all LED chains combined.

In order to determine the Max Lumens that can be safely produced by all LED chains combined, one LED chain is chosen to provide its maximum lumens output at 25° C. and the lumens needed from the other chains to produce the Target Lumens value are determined. If the needed lumens are greater than the Max Lumens, the lumens of all chains are scaled down proportionally by a Scale Factor value. In some embodiments, the LED chain providing maximum lumens output may be chosen based on the target chromaticity and white mix settings chosen for the illumination device.

Figures 7A, 7B:
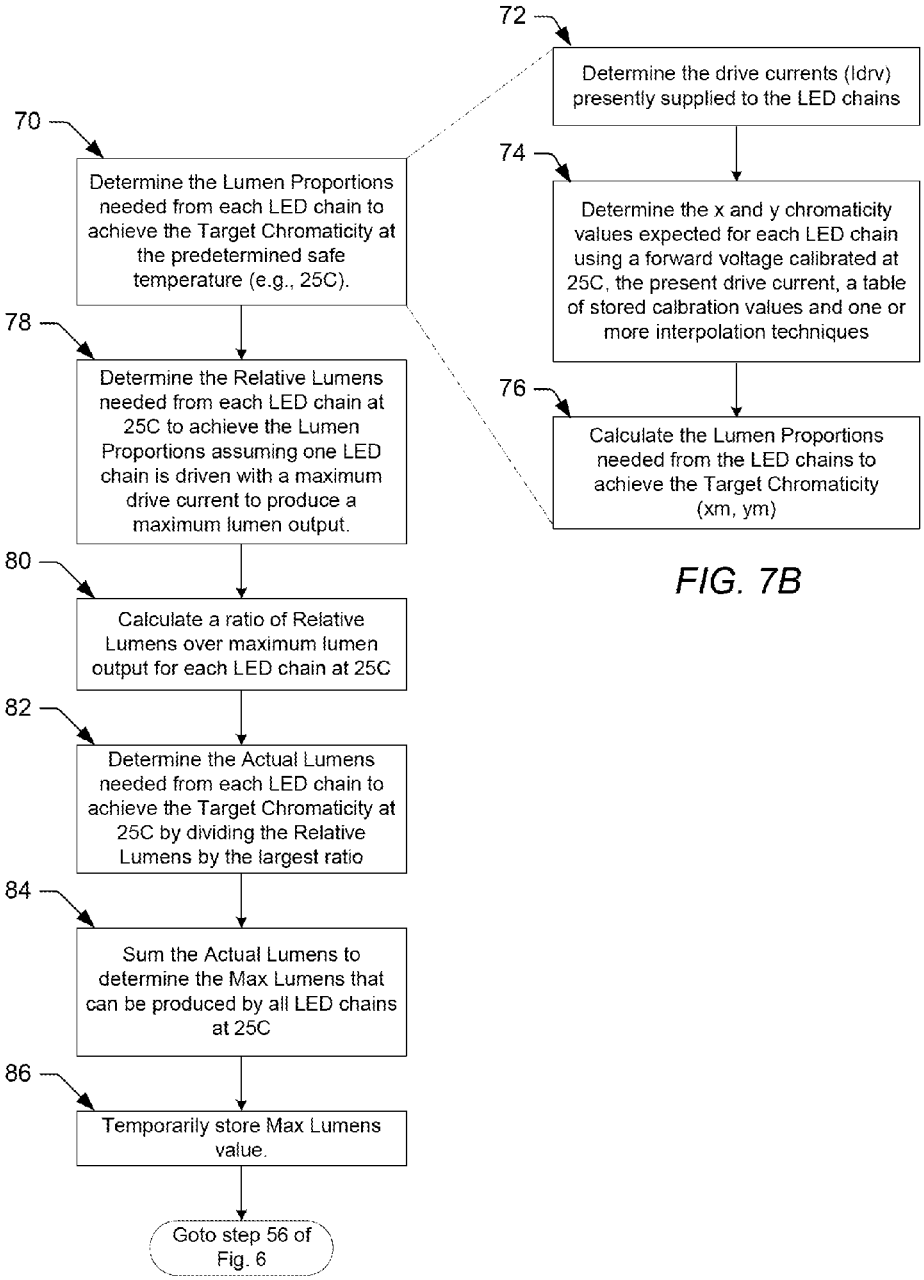

FIGS. 7A and 7B are flowchart diagrams illustrating one embodiment of a method, which can be used to determine the Max Lumens value (in step 54). As shown in FIG. 7A, the method may generally begin (in step 70) by determining the lumen proportions that are needed from each LED chain to achieve the Target Chromaticity setting at the predetermined safe temperature. Exemplary method steps for determining the lumen proportions for each LED chain are shown in FIG. 7B. In step 72, for example, the method may determine the drive currents (Idrv), which are presently supplied to each of the LED chains by the LED driver circuitry. In step 74, the method may determine the chromaticity values ($x_i$, $y_i$) that are expected for each LED chain using a forward voltage (Vfe_safe) value, which was previously calibrated for each LED chain at the predetermined safe temperature, the drive current (Idrv) presently supplied to each LED chain, a table of calibration values stored within the illumination device, and one or more interpolation techniques.

Figure 8:
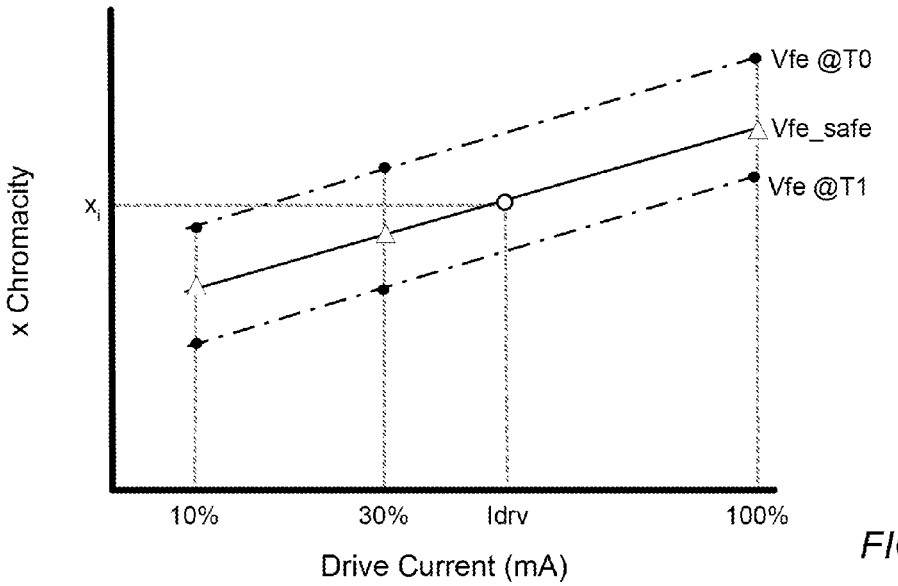
FIG. 8 is a graphical representation depicting how one or more interpolation technique(s) may be used in the methods of FIGS. 7B and 12B to determine the expected x chromaticity value for a given LED chain using a calibrated or measured forward voltage (Vfe_safe or Vfe_present), the present drive current and a table of stored calibration values.
Figure 9:
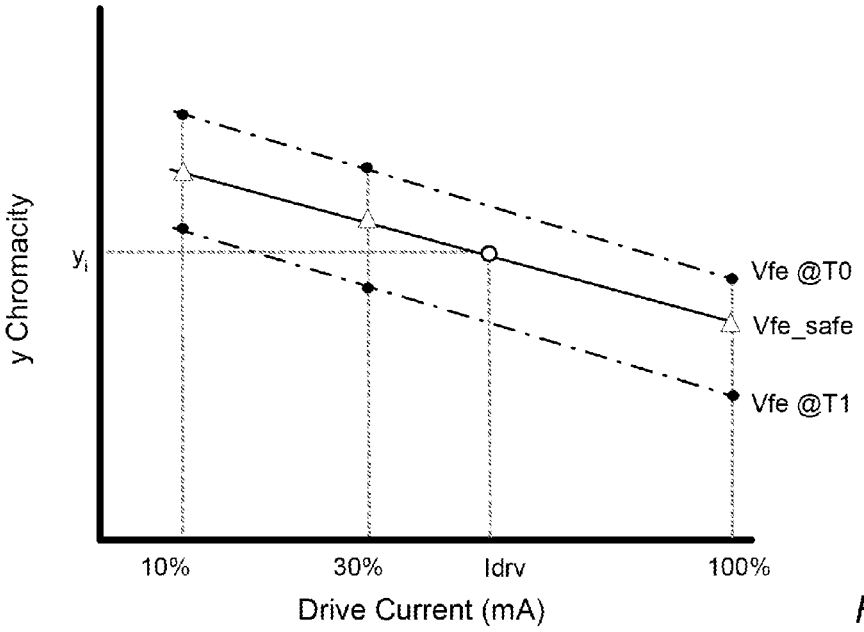
FIG. 9 is a graphical representation depicting how one or more interpolation technique(s) may be used in the methods of FIGS. 7B and 12B to determine the expected y chromaticity value for a given LED chain using a calibrated or measured forward voltage (Vfe_safe or Vfe_present), the present drive current and a table of stored calibration values.

The graphs shown in FIGS. 8-9 depict how one or more interpolation technique(s) may be used to determine the expected x and y chromaticity values ($x_i$, $y_i$) for a given LED chain at the predetermined safe temperature (Vfe_safe) and the present drive current (Idrv) from a table of stored calibration values. In FIGS. 8-9, the solid dots (●) represent examples of x and y chromaticity calibration values, which were previously obtained during calibration of the illumination device at three different drive currents (e.g., 10%, 30% and 100% of the maximum drive current) and two different temperatures (e.g., T0 and T1) and stored within the table of calibration values. Exemplary methods for obtaining such calibration values are described in co-pending application Ser. Nos. 14/314,451 and 14/471,057, which are incorporated herein in their entirety. The stored calibration values are not limited to only those shown in FIGS. 8-9.

In some embodiments, two interpolation techniques may be needed to determine the expected x and y chromaticity values ($x_i$, $y_i$) for a given LED chain at the predetermined safe temperature (Vfe_safe) and the present drive current (Idrv). As shown in FIGS. 8-9, e.g., a first linear interpolation may be applied to the stored calibration values (●) to calculate the x and y chromaticity values (Δ), which should be produced at the predetermined safe temperature (Vfe_safe) when using the same three drive currents (e.g., 10%, 30%, and 100% of the maximum drive current) used during the calibration phase. If the drive current (Idrv) presently supplied to the LED chain differs from one of the calibrated drive current levels, a second interpolation may be applied to the calculated x and y chromaticity values (Δ) to generate a relationship there between (denoted by the solid line in FIGS. 8-9). The second interpolation may be linear or non-linear depending on the color of the LED chain. From this relationship, the expected x and y chromaticity values ($x_i$, $y_i$) for a given LED chain may be determined for the present drive current (Idrv).

In other embodiments, only one interpolation technique may be needed to determine the x and y chromaticity values ($x_i$, $y_i$) that are expected for a given LED chain at the predetermined safe temperature (Vfe_safe) and the present drive current (Idrv). For example, if at least some of the x and y chromaticity calibration values (●) were previously measured at the predetermined safe temperature (i.e., if T0=25° C.), a linear interpolation technique may be applied directly to the stored calibration values (●) to determine a relationship there between (denoted by the dashed line at Vfe @ T0 in FIGS. 8-9). From this relationship, the expected x and y chromaticity values ($x_i$, $y_i$) for a given LED chain may be determined for the present drive current (Idrv).

The x and y chromaticity values expected for each emission LED chain may be expressed as a color point in the form of ($x_i$, $y_i$). In an illumination device comprising four LED chains, for example, step 74 of FIG. 7B may result in the generation of four expected color points: ($x_1$, $y_1$), ($x_2$, $y_2$), ($x_3$, $y_3$), and ($x_4$, $y_4$). Once the expected color points are determined, the expected color points can be used to determine the lumen proportions that are needed from each of the LED chains to achieve the Target Chromaticity (xm, ym) setting for the illumination device (in step 76). As indicated above, the Target Chromaticity (xm, ym) setting may be stored with a storage medium of the illumination device, and in some embodiments, may include a 16-bit x chromaticity variable and a 16-bit y chromaticity variable. If a white LED is included within the illumination device, a 16-bit white mix variable may be combined with the 16-bit x and y chromaticity values to further define the Target Chromaticity (xm, ym) setting.

Since lumen proportions are desired, a Target Lumens (Ym) value of "1" is assumed in the calculation of the lumen proportions in step 76 of FIG. 7B. For example, if four emission LED chains are included within the illumination device, the Target Lumens (Ym) for the combined light from all LED chains may be expressed as:

$$Ym=Y_1+Y_2+Y_3+Y_4=1$$

where $Y_1$, $Y_2$, $Y_3$, and $Y_4$ represent the lumen proportions of the four emission LED chains. These lumen proportions ($Y_1$, $Y_2$, $Y_3$ and $Y_4$) may be calculated using well-known color mixing equations, the Target Chromaticity (xm, ym) values set within the illumination device, and the expected color points ($x_1$, $y_1$), ($x_2$, $y_2$), ($x_3$, $y_3$), ($x_4$, $y_4$) determined in step 74 of FIG. 7B. As these equations are well-known and readily understood by a skilled artisan, further description of such equations will be omitted herein. In one example, the lumen proportions determined in step 76 may be 0.2, 0.2, 0.2 and 0.4 for chains of red, green, blue and white LEDs, respectively. Of course, substantially different lumen proportions may be determined for different Target Chromaticity values and different combinations of LED chains.

Once the lumen proportions (e.g., $Y_1$, $Y_2$, $Y_3$, and $Y_4$) are calculated for each emission LED chain in step 76 of FIG. 7B, the method calculates the Relative Lumens needed from each LED chain at 25° C. to achieve the lumen proportions in step 78 of FIG. 7A. In calculating the Relative Lumens, one of the LED chains is assumed to be driven with a maximum drive current to produce a maximum lumen output, as described above. For example, the method may assume that a chain of white LEDs is driven with a maximum drive current (e.g., 900 mA) to produce a maximum lumen output of, e.g., 1000 lumens. If the lumen proportions determined in step 76 are 0.2, 0.2, 0.2 and 0.4 for chains of red, green, blue and white LEDs, the Relative Lumens needed from each LED chain to achieve the lumen proportions would be 500 lumens from the red LED chain, 500 lumens from the green LED chain, 500 lumens from the blue LED chain, and 1000 lumens from the white LED chain.

In step 80, the Relative Lumens from step 78 are divided by the maximum lumens that can be produced by each LED chain at 25° C. (which is known and stored in memory as discussed above) to determine a ratio of Relative Lumens over maximum lumens for each LED chain. In the above example, a ratio of Relative Lumens over maximum lumens may be:

500/250=2 for the red LED chain;
500/400=1.25 for the green LED chain;
500/50=10 for the blue LED chain; and
1000/1000=1 for the white LED chain.

In step 82, the Actual Lumens needed from each LED chain to achieve the Target Chromaticity at 25° C. is determined by dividing the Relative Lumens from step 78 by the largest ratio calculated in step 80. In the above example, the LED chain with the largest ratio (e.g., 10) is the blue LED chain. Thus, the Actual Lumens may be determined in the current example by dividing the Relative Lumens (e.g., 500, 500, 500 and 1000 lumens) determined in step 78 for the red, green, blue and white LED chains by 10 to achieve an Actual Lumens of 50 lumens from the red LED chain, 50 lumens from the green LED chain, 50 lumens from the blue LED chain, and 100 lumens from the white LED chain.

In step 84, the Actual Lumens from all LED chains are summed to determine the Max Lumens that can be produced by all LED chains at 25° C. In the current example, a Max Lumens of 50+50+50+100=250 lumens is determined (in step 84) and temporarily stored in memory (in step 86). Once the Max Lumens value is determined, process flow returns to step 56 of FIG. 6.

Step 56 of FIG. 6 determines the Drive Currents (Ix) that are needed from each LED chain to produce the Actual Lumens for each chain at the predetermined safe temperature. According to one embodiment, the Drive Currents (Ix) may be determined using a forward voltage (Vfe_safe), which was previously calibrated for each LED chain at the predetermined safe temperature, the Actual Lumens values determined in step 82 for each LED chain, the table of calibration values stored within the illumination device, and one or more interpolation techniques.

Figure 10:
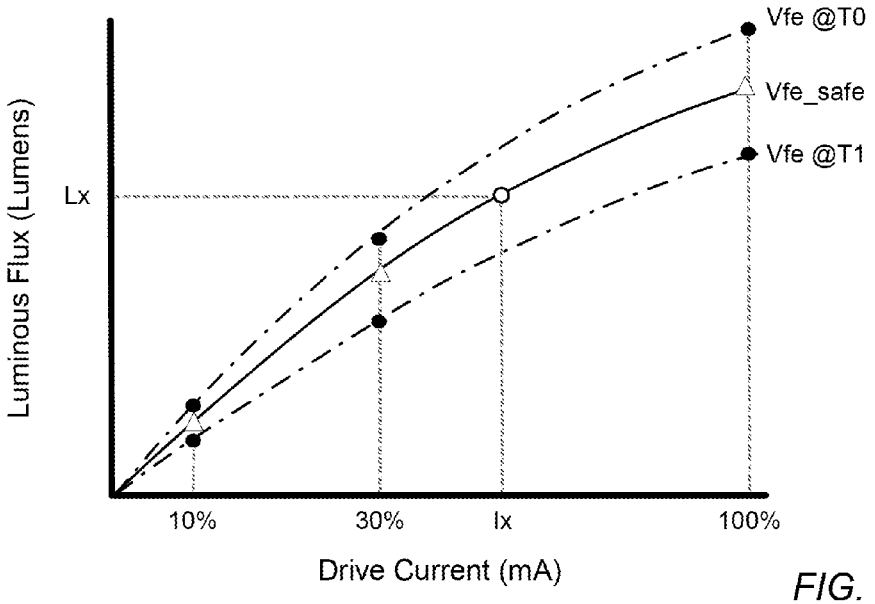
FIG. 10 is a graphical representation depicting how one or more interpolation technique(s) may be used to determine the Drive Currents (Ix) needed from each LED chain to produce the Actual Lumens at the predetermined safe temperature in step 56 of FIG. 6, and the Drive Currents (Ix) needed from each LED chain to produce the Actual Lumens at the present operating temperature in step 118 of FIG. 12A.

The graph shown in FIG. 10 depicts how one or more interpolation technique(s) may be used to determine the Drive Currents (Ix) needed from each LED chain (in step 56) to produce the Actual Lumens (Lx) determined in step 82 of FIG. 7A. In FIG. 10, the solid dots (●) represent exemplary luminous flux calibration values, which were previously obtained during calibration of the illumination device at three different drive currents (e.g., 10%, 30% and 100% of the maximum drive current) and two different temperatures (e.g., T0 and T1) and stored within the table of calibration values. Exemplary methods for obtaining such calibration values are described in co-pending application Ser. Nos. 14/314,451 and 14/471,057, which are incorporated herein in their entirety. The stored calibration values are not limited to only those shown in FIG. 10.

In some embodiments, two interpolation techniques may be needed to determine the Drive Currents (Ix) that are respectively needed for each LED chain to produce the Actual Lumens (Lx) determined in step 82. For example, a first linear interpolation may be applied to the stored luminous flux calibration values (●) to calculate the luminous flux values (Δ), which should be produced at the predetermined safe temperature (Vfe_safe) when using the same three drive currents (e.g., 10%, 30%, and 100% of the maximum drive current) used during the calibration phase. If the Actual Lumens (Lx) produced by a given LED chain differs from one of the calculated luminous flux values (Δ), a second interpolation may be applied to the calculated luminous flux values to generate a relationship there between (denoted by the solid line in FIG. 10). The second interpolation may be linear or non-linear depending on the color of the LED chain. From this relationship, the Drive Currents (Ix) needed for a given LED chain to produce the Actual Lumens (Lx) may be determined.

In other embodiments, only one interpolation technique may be used to determine the Drive Currents (Ix) that are needed for each LED chain to produce the Actual Lumens (Lx) determined in step 82. For example, if the luminous flux calibration values (●) were previously measured at the predetermined safe temperature (i.e., if T0=25° C.), a linear or non-linear interpolation technique may be applied directly to the stored luminous flux calibration values (●) to determine a relationship there between (denoted by the dashed line at Vfe @ T0 in FIG. 10). From this relationship, the Drive Currents (Ix) needed for a given LED chain to produce the Actual Lumens (Lx) may be determined.

Once the Drive Currents are known, the total power ("Total Power") drawn by all LED chains at the predetermined safe temperature may be estimated (in step 58). The Total Power drawn by all LED chains is the sum of the power drawn by each individual chain (e.g., P1+P2+P3+P4 when four LED chains are included). In one embodiment, the power drawn by each individual LED chain can be estimated by multiplying a respective Drive Current (Ix) with a forward voltage value (Vfe_est) estimated for that Drive Current at 25° C. In one example, the forward voltage values (Vfe_safe) that were previously calibrated for each LED chain at 25° C. may be scaled (e.g., by some fixed amount or by using characterization data and a curve fitting approach) to estimate the forward voltage values (Vfe_est) corresponding to the Drive Currents.

In step 60, a Scale Factor is generated for adjusting a Target Lumens value set for the illumination device to ensure that the Drive Currents determined for each LED chain (in step 56) and the estimated Total Power drawn by all LED chains (in step 58) at the predetermined safe temperature will not exceed a maximum safe current level ("Max Current") or a maximum safe power level ("Max Power") attributed to the power converters (e.g., power converters 14 and 32 of FIGS. 1-2) of the illumination device at the predetermined safe temperature.

FIG. 11 is a flowchart diagram illustrating one embodiment of a method, which can be used to generate a Scale Factor for a predetermined safe temperature. As shown in FIG. 11, the Scale Factor value may be temporarily set to "1" (in step 90) for a first iteration of possibly multiple iterations used to generate the Scale Factor value. In this embodiment, the maximum safe current level ("Max Current") and the maximum safe power level ("Max Power") attributed to the power converter(s) may then be determined for the predetermined safe temperature (in step 94).

As shown in FIG. 3, the saturation current ($I_{sat}$) associated with a power converter decreases linearly with increasing temperatures above the predetermined safe temperature (e.g., 25° C.), and in some cases, may decrease as much as 30-40% over a 25° C.-100° C. temperature range. This decreasing saturation current decreases the Max Current associated with the DC/DC converters 32 and the Max Power associated with the AC/DC converter 14. In some embodiments, a relationship of $I_{sat}$ vs. temperature may be stored within a storage medium of the illumination device (e.g., storage medium 23) for each power converter. In one example, the slope and intercept of the $I_{sat}$ vs. temperature relationship shown in FIG. 3 may be stored for each power converter. While the relationship of $I_{sat}$ vs. temperature may be similar for each power converter, slightly different slope and intercept values may be stored so that each power converter can be individually characterized.

From the stored $I_{sat}$ vs. temperature relationships, the Max Current associated with each of the DC/DC converters 32 and the Max Power associated with the AC/DC converter 14 may be determined at the predetermined safe temperature by linearly interpolating between the stored values (in step 94). In one embodiment, the Max Current at 25° C. may be approximately 900 mA for the white, red and green LED chains and approximately 400 mA for the blue LED chain, and the Max Power at 25° C. may be approximately 16 W.

In step 96, a ratio of Max Power (from step 94) over Estimated Total Power (from step 58) is calculated for the AC/DC converter 14. In step 98, a ratio of Max Current (from step 94) over Drive Current for each LED chain (from step 56) is calculated for each of the DC/DC converters 32. The smallest of the ratios calculated in steps 96 and 98 is multiplied with the Scale Factor value (e.g., "1" from step 90 if on first iteration) and the result is stored as a new Scale Factor value (in step 100). If the result is greater than 1, the new Scale Factor value is clipped at 1.

As noted above, the Drive Currents (Ix) determined in step 56 of FIG. 6 were calculated under the assumption that one LED chain was driven with a maximum drive current to provide a maximum lumen output (step 78 of FIG. 7A). This means that one of the Max Current/Drive Current ratios determined in step 98 will be "1" (for the LED chain driven with maximum drive current), and the Max Current/Drive Current ratios for the other LED chains should be values less than or equal to "1." The Max Power/Total Power ratio may be more or less than one, depending on the combined Drive Currents (step 56) needed to achieve the Target Chromaticity. The smallest of the ratios calculated in steps 96 and 98 is used in step 100 to generate the Scale Factor. In one example, a Scale Factor of 0.5 may be generated in step 100 if the estimated Total Power is twice as much as the Max Power.

Once the Scale Factor is determined (in step 100), a Target Lumens value is calculated (in step 62 of FIG. 6) according to the equation:

Target Lumens=Brightness*Max Lumens*Scale Factor where "Brightness" typically refers to the brightness setting stored within the illumination device, "Max Lumens" refers to the Max Lumens value calculated in step 54, and "Scale Factor" refers to the scale factor generated in step 100. In this step, however, the Target Lumens value is calculated with the Brightness value temporarily set to "1," and the results of the calculation are used to update the stored Max Lumens value. In some embodiments, the method may proceed immediately to FIG. 12A to adjust the Target Lumens value to account for changes in the Brightness setting and/or to adjust the Scale Factor value to account for changes in brightness due to temperature changes.

In some embodiments, steps 54-62 of FIG. 6 may be repeated a number of times to minimize errors. For example, as the Scale Factor reduces, the Target Lumens value determined in step 62 reduces, which decreases the drive currents supplied to the LED chains, improves LED efficiency and changes the relative drive currents between the LED chains. When this occurs, it may be beneficial to repeat steps 54-62 to determine the chromaticity values that are expected for each LED chain at the new drive currents supplied thereto to provide a more accurate representation of the Max Lumens value. For all subsequent iterations of steps 54-62, step 90 of FIG. 11 is not performed and the previous Scale Factor value is used instead, so that the Scale Factor changes less and less with each iteration. The Max Lumens value is not updated with the Target Lumens value calculated in step 62 until all iterations are complete.

Figures 12A, 12B:
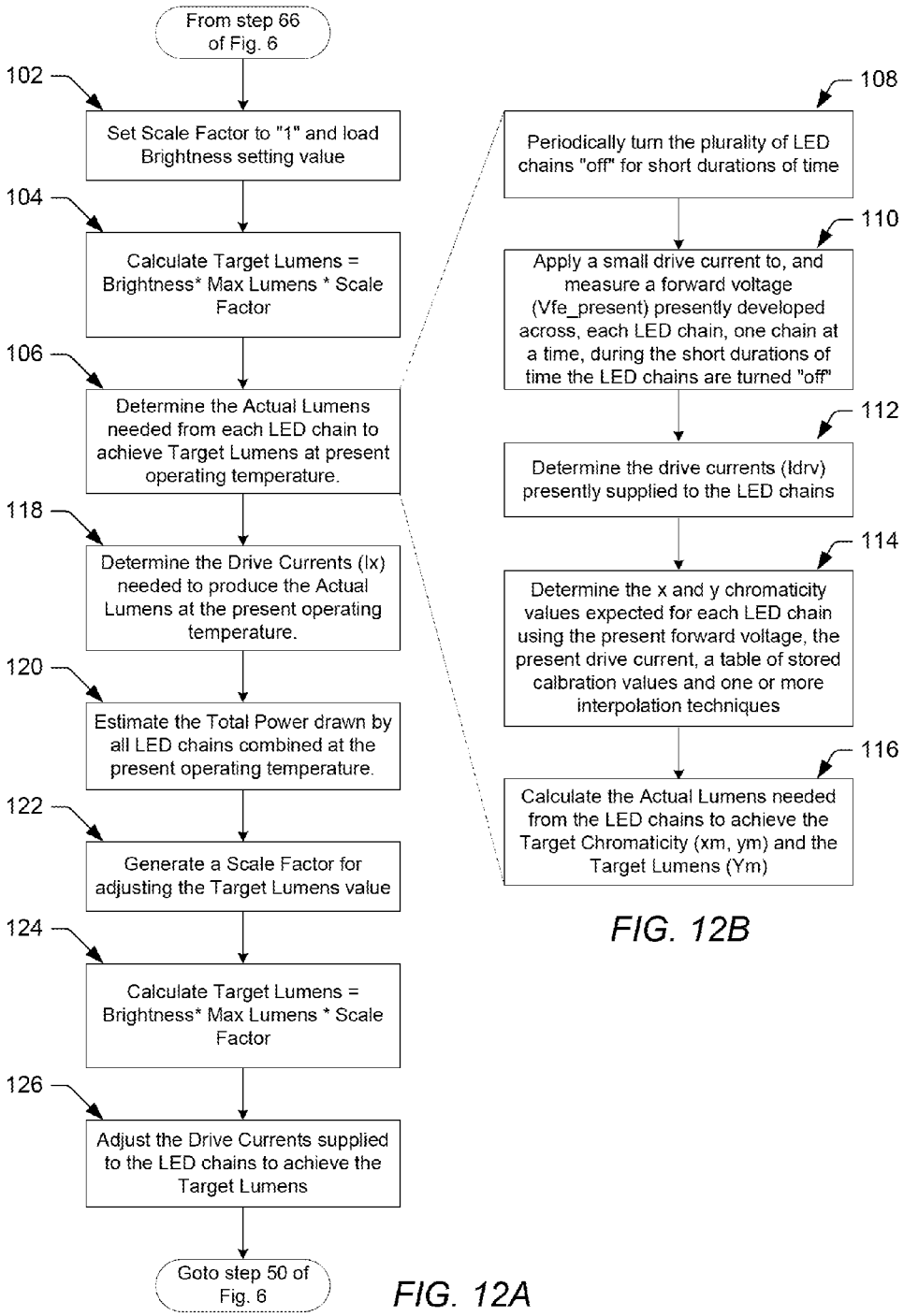
FIGS. 12A and 12B are flow chart diagrams illustrating an exemplary method for adjusting the Target Lumens value to account for changes in the brightness setting and/or to adjust the scale factor to account for changes in brightness due to temperature changes.

If a change in Brightness setting is detected (in step 64 of FIG. 6), the method may also proceed to FIG. 12A (in step 66). Although similar method steps are shown in FIGS. 6 and 12A, the method shown in FIG. 12A determines the Drive Currents that should be supplied to the LED chains, estimates the Total Power that should be drawn by the LED chains, and generates the Scale Factor at the present operating temperature, instead of the predetermined safe temperature used in steps 56, 58 and 60 of FIG. 6. This provides more accurate Drive Currents, Estimated Total Power and Scale Factor values for the present operating temperature. The method shown in FIG. 12A also calculates the Target Lumens using the brightness setting stored within the illumination device, and thus, provides a more accurate Target Lumens value.

In some embodiments, the method shown in FIG. 12A may begin by temporarily resetting the Scale Factor to "1" and loading the brightness setting (in step 102), for example, from the interface 20 or storage medium 23 of the illumination device. In step 104, the Target Lumens value is again calculated according to the equation:

Target Lumens=Brightness*Max Lumens*Scale Factor this time using the brightness setting stored within the illumination device and retrieved in step 102, the Max Lumens value stored in step 62 of FIG. 6, and the Scale Factor set to "1." Since the Scale Factor is temporarily set to "1" in step 102, the Target Lumens value calculated in step 104 may be considered a temporary Target Lumens value.

In step 106, the method determines the Actual Lumens needed from each LED chain to achieve the Target Lumens value (from step 104) at the present operating temperature. Exemplary method steps for determining the Actual Lumens needed from each LED chain are shown in FIG. 12B. While the method steps shown in FIG. 12B are similar to those shown in FIG. 7B and discussed above, there are two exceptions.

First, the x and y chromaticity values expected for each LED chain are determined (in step 114) at the present operating temperature, instead of the predetermined safe temperature, by measuring a forward voltage (Vfe_present) presently developed across each LED chain. This is achieved during operation of the illumination device by periodically turning all LED chains "off" for short periods of time (in step 108), applying a relatively small, non-operative drive current to each LED chain, one chain at a time, during the short durations of time, and measuring the forward voltage (Vfe_present) developed there across (in step 110). Methods for measuring a forward voltage are described further in co-pending application Ser. Nos. 14/314,530; 14/314,580; and 14/471,081. After the forward voltages are measured across each LED chain, the drive currents (Idrv) supplied to the LED chains to produce illumination are determined (in step 112) from the LED driver circuitry. In step 114, the x and y chromaticity values expected for each LED chain ($x_i$, $y_i$) are determined using the forward voltage (Vfe_present) measured in step 110, the drive current determined in step 112, a table of stored calibration values and one or more interpolation techniques. The x and y chromaticity values expected for each LED chain ($x_i$, $y_i$) may be determined in the same manner described above in step 74 of FIG. 7B and shown in FIGS. 8-9, except that the chromaticity values are determined for Vfe_present, instead of Vfe_safe.

As a second distinction, the method shown in FIG. 12B calculates the Actual Lumens needed from each LED chain to achieve the Target Chromaticity (xm, ym) setting and the Target Lumens (Ym) in step 116. Although Actual Lumens are calculated (in step 116 of FIG. 12B) instead of lumen proportions (in step 76 of FIG. 7B), the process is essentially the same. For example, the Target Lumens (Ym) for the combined light from four LED chains may be expressed as:

$$Ym=Y_1+Y_2+Y_3+Y_4$$

In this case, however, Ym is not set to "1," so that $Y_1$, $Y_2$, $Y_3$, and $Y_4$ represent the Actual Lumens needed from the four LED chains to produce the Target Lumens (Ym) value determined in step 104. The Actual lumens ($Y_1$, $Y_2$, $Y_3$ and $Y_4$) may be calculated using well-known color mixing equations, the Target Chromaticity (xm, ym) values set within the illumination device, and the expected color points ($x_1$, $y_1$), ($x_2$, $y_2$), ($x_3$, $y_3$), ($x_4$, $y_4$) determined in step 114 of FIG. 12B. As these equations are well-known and readily understood by a skilled artisan, further description of such equations will be omitted herein.

In step 118, the Drive Currents (Ix) needed for each LED chain to produce the Actual Lumens at the present operating temperature are determined. According to one embodiment, the Drive Currents may be determined using the forward voltage (Vfe_present) measured for each LED chain in step 110, the Actual Lumens determined for each LED chain in step 106/116, the table of calibration values stored within the illumination device, and one or more interpolation techniques. The Drive Currents needed for each LED chain may be determined in the same manner described above in step 56 of FIG. 6 and shown in FIG. 10, except that the Drive Currents are determined at Vfe_present, instead of Vfe_safe.

In step 120, the total power ("Total Power") drawn by all LED chains at the present operating temperature is estimated. As noted above, the power drawn by each LED chain can be estimated by multiplying a respective Drive Current determined in step 118 with a forward voltage value (Vfe_est), which is estimated for that Drive Current level at the present operating temperature. The Total Power drawn by all LED chains can then be calculated by summing the power drawn by each chain (e.g., P1+P2+P3+P4 when four LED chains are included). In one example, the forward voltage (Vfe_safe) values that were previously calibrated for each LED chain at 25° C. may be scaled (e.g., by some fixed amount or by using characterization data and a curve fitting approach) to estimate the forward voltage (Vfe_est) values corresponding to the respective Drive Currents at the present operating temperature. Alternatively, the forward voltages (Vfe_present) measured for each LED chain in step 110 may be scaled to estimate the forward voltage (Vfe_est) values corresponding to the respective Drive Currents at the present operating temperature.

In step 122, a Scale Factor is generated for adjusting the Target Lumens value to ensure that the Drive Currents determined for each LED chain (in step 118) and the estimated Total Power drawn by all LED chains (in step 120) at the present operating temperature will not exceed a maximum safe current level ("Max Current") or a maximum safe power level ("Max Power") attributed to the power converters (e.g., power converters 14 and 32 of FIGS. 1-2) at the present operating temperature.

An exemplary method for generating a Scale Factor for a predetermined safe temperature was described above with respect to FIG. 11. In step 122 of FIG. 12A, a Scale Factor is generated at the present operating temperature, instead of the predetermined safe temperature. While a similar method is used, additional method steps may be needed to generate the Scale Factor at the present operating temperature.

Returning to FIG. 11, the Scale Factor value is again temporarily set to "1" (in step 90). However, in this case, the present operating temperature is measured (in step 92) before the Max Power and Max Currents are determined for the power converters (in step 94). According to one embodiment, the present operating temperature can be measured by a temperature sensor (e.g., temperature sensor 28, FIG. 1), which is coupled to a circuit board or chip comprising one or more of the power converters, control circuit, driver circuitry and emission LEDs. Once the present operating temperature is measured (in step 92), the Max Current associated with each of the DC/DC converters 32 and the Max Power associated with the AC/DC converter 14 may be determined at the present operating temperature (in step 94), instead of the predetermined safe temperature.

As noted above, the Max Current may be approximately 900 mA for the white, red and green LED chains and approximately 400 mA for the blue LED chain at 25° C., and the Max Power may be approximately 16 W at 25° C. However, these values decrease significantly above the safe operating temperature. At a present operating temperature of about 75° C., for example, the Max Current of the DC/DC converters 32 and the Max Power of the AC/DC converter 14 may only be about 80% of their safe temperature (25° C.) values. Step 94 of FIG. 11 determines the Max Current and Max Power values for the power converters at the present operating temperature. According to one embodiment, the Max Current and Max Power values may be determined by linearly interpolating between the stored slope and intercept values corresponding to the $I_{sat}$ vs. temperature relationships (FIG. 3) attributed to each of the power converters.

In step 96, a ratio of Max Power (from step 94) over Estimated Total Power (from step 58) is calculated for the AC/DC converter 14. In step 98, a ratio of Max Current (from step 94) over Drive Current for each LED chain (from step 56) is calculated for each of the DC/DC converters 32. The smallest of the ratios calculated in steps 96 and 98 is multiplied with the Scale Factor value (e.g., "1" from step 90 if on first iteration) and the result is stored as a new Scale Factor value (in step 100). If the result is greater than 1, the new Scale Factor value is clipped at 1.

Once the Scale Factor is generated (in step 122), the Target Lumens value is again calculated (in step 124) according to the equation:

$$\text{Target Lumens}=\text{Brightness}*\text{Max Lumens}*\text{Scale Factor}$$

using the brightness setting stored within the illumination device, the Max Lumens value calculated in step 62 of FIG. 6, and the scale factor generated in step 122 of FIG. 12A. When operating temperatures are less than or equal to the predetermined safe temperature, the method described thus far provides a precise lumen output for the particular chromaticity, white mix and brightness level settings selected for the illumination device. Above the predetermined safe temperature, the Scale Factor generated in step 122 scales the lumen output with temperature, so as not to exceed the Max Power or Max Current associated with the power converters at the present operating temperature. This avoids an "over-power" or "over-current" condition in the power converters, which improves lamp efficiency and prevents saturation of the inductive core.

In some embodiments, the drive currents supplied to the LED chains may be adjusted in step 126 (via driver circuitry 24, for example) to achieve the new Target Lumens value calculated in step 124. The illumination device may produce illumination at the new drive current levels, and the method may continue to monitor for changes in lamp settings in step 50 of FIG. 6.

In other embodiments, steps 106-124 of FIGS. 12A and 12B may be repeated a predetermined number of times to minimize errors before the drive currents are adjusted in step 126. For example, as the Scale Factor reduces with increasing temperatures above 25° C., the Target Lumens value determined in step 124 decreases, which improves LED efficiency and changes the relative drive currents between the LED chains. When this occurs, it may be beneficial to repeat steps 106-124 to determine the chromaticity values that are expected (in step 114) for each LED chain at the new drive currents to provide a more accurate representation of the Max Lumens value. For all subsequent iterations of steps 106-124, however, step 90 of FIG. 11 is not performed and the previous Scale Factor value is used instead, so that the Scale Factor changes less and less with each iteration.

In yet other embodiments, one or more of the compensation methods described in co-pending application Ser.

Nos. 14/314,530; 14/314,580; and 14/471,081 may be performed to fine tune the drive currents before the adjusted drive currents are supplied to the LED chains (in step 126). The method shown in FIGS. 12A and 12B is assumed to include all such embodiments.

By performing the method steps illustrated in FIGS. 6-12B and described above, the control circuitry (e.g., control circuit 22, FIG. 1) of an illumination device is able to control the respective drive currents supplied to the emission LED chains (e.g., LED chains 26) by the driver circuits (e.g., driver circuitry 24), so as not to exceed a maximum safe power level ("Max Power") and/or a maximum safe current level ("Max Current") attributed to the power converters (e.g., AC/DC converter 14, DC/DC converters 32) at the present operating temperature. As noted above, the methods shown in FIGS. 6-12B are generally performed when the illumination device is first turned "on," and any time a change in lamp settings (e.g., target chromaticity, white mix and/or brightness level) is detected during normal operation of the illumination device. However, since the Max Power and Max Current that can be safely produced by the AC/DC and DC/DC power converters are affected by changes in temperature (above the predetermined safe temperature), additional steps may be needed to fine tune the drive currents during operation of the illumination device when no changes in lamp settings are detected.

Figure 13A:
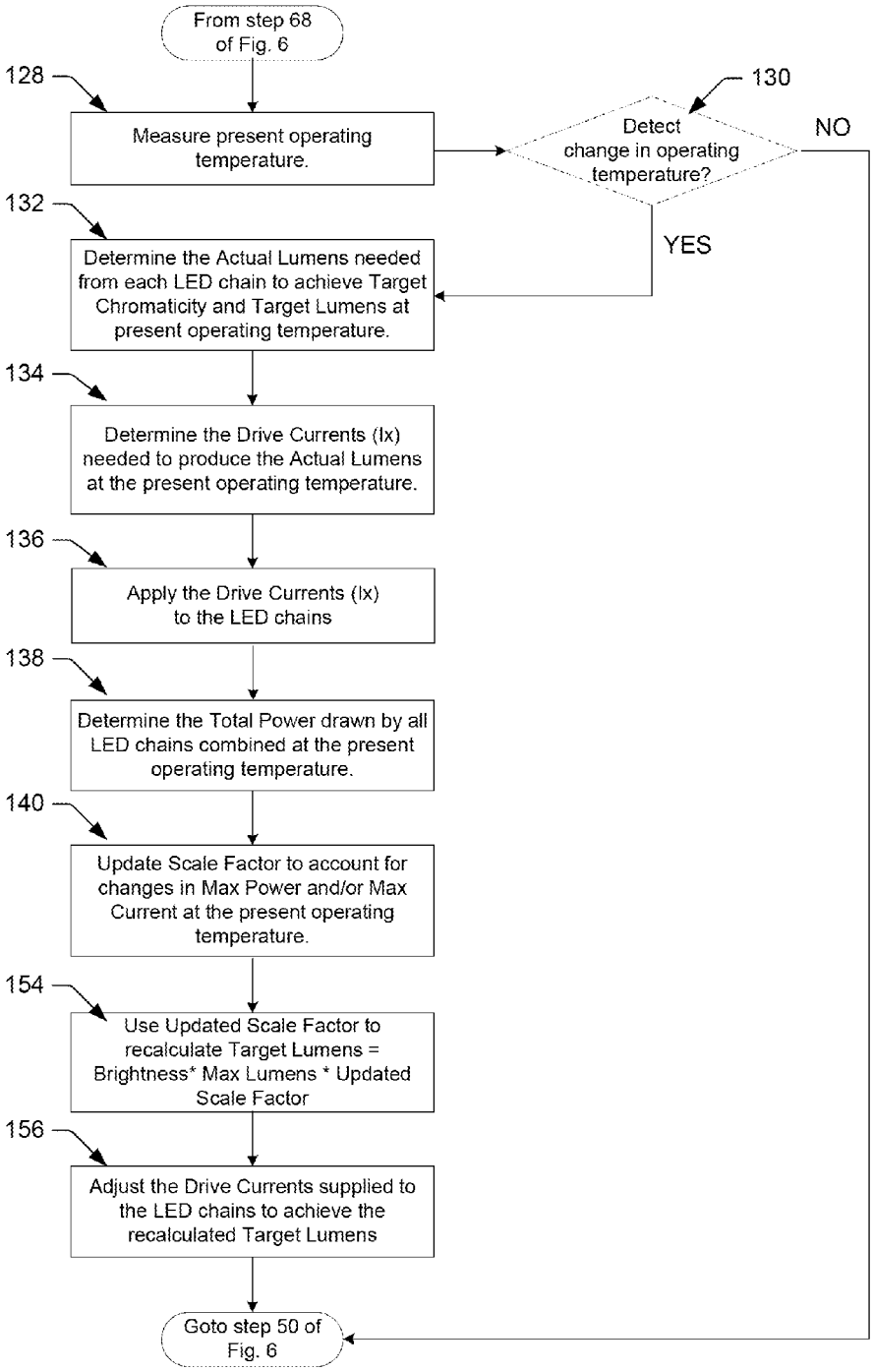
FIGS. 13A and 13B are flow chart diagrams illustrating an exemplary method for continually or periodically updating the scale factor to account for temperature related changes in the maximum safe power level attributed to the power converters during normal operation of the illumination device when no changes are made to the target chromaticity or brightness settings.

If no changes in lamp settings are detected in step 50 of FIG. 6, the method may proceed (in step 68) to the normal operation mode shown in FIG. 13A. During normal operation, in which no changes are made to the brightness level or the target chromaticity or white mix variables stored within the illumination device, the drive currents supplied to the LED chains are continually or periodically updated as the operating temperature changes over time. As drive currents increase, the operating temperature increases, which decreases the Max Current and the Max Power associated with the power converters. The method shown in FIG. 13A is used during normal operation of the illumination device to continually or periodically adjust the Scale Factor value, so as to account for temperature related changes in the Drive Current, Total Power, Max Current and/or Max Power.

In some embodiments, the method shown in FIG. 13A may begin by re-measuring the present operating temperature (in step 128). As noted above, the present operating temperature may be measured by a temperature sensor (e.g., temperature sensor 28, FIG. 1), which is coupled to a circuit board or chip comprising, e.g., one or more of the power converters, control circuit, driver circuitry and/or emission LEDs. Other means for measuring the present operating temperature may also be used.

In some embodiments, the operating temperature measured in step 128 of FIG. 13A may be compared to a previously measured operating temperature to determine if the operating temperature has changed by a certain amount. In one embodiment, a change in temperature may be detected (in optional step 130) if the operating temperature changes by about 1° C. However, the detecting step is not limited to any particular increment of temperature, may be configured to detect substantially any predetermined difference in operating temperature, and may not be performed in all embodiments.

If no change in temperature is detected (in optional step 130), the method may proceed to step 50 of FIG. 6 to continue monitoring for changes in lamp settings. If no changes in lamp settings are detected in step 50 of FIG. 6, the method may continually or periodically monitor the present operating temperature in step 128 of FIG. 13A until a change in operating temperature is detected (in step 130). If optional step 130 is not included, method steps 128-156 may be performed continually or periodically, whilst no changes in lamp settings are detected, to update the Scale Factor to account for temperature related changes.

If a change in operating temperature is detected (in optional step 130), the Actual Lumens needed from each LED chain to achieve the Target Chromaticity (xm, ym) setting stored within the illumination device and the most recently calculated Target Lumens (Ym) may be determined in step 132 for the new present operating temperature, as described above in step 106 of FIG. 12A. In step 134, the Drive Currents (Ix) needed to produce the Actual Lumens at the present operating temperature may be determined for each LED chain, as described above in step 118 of FIG. 12A. In step 136, the Drive Currents (Ix) determined in step 134 may be supplied to the LED chains via the LED driver circuitry.

In step 138, the Total Power actually drawn by all LED chains at the present operating temperature is calculated by summing the power drawn by each individual LED chain (e.g., P1+P2+P3+P4). As noted above, the power drawn by each LED chain may be calculated by multiplying the drive current presently supplied to the LED chain with a forward voltage corresponding to that drive current. In this case, however, the forward voltage values are not estimated. Instead, each forward voltage value is calculated by multiplying an input voltage supplied to a respective DC/DC converter (e.g., DC/DC converters 32 of FIG. 2) by the duty cycle of that converter. This provides a more accurate representation of the Total Power actually being drawn by all LED chains, compared to the estimates determined in steps 58 and 120.

In step 140, the Scale Factor value is updated to account for any changes in the maximum safe current level ("Max Current") and/or the maximum safe power level ("Max Power") of the power converter(s) at the new present operating temperature. An exemplary method for updating the Scale Factor value is shown in FIG. 13B.

Figure 13B:
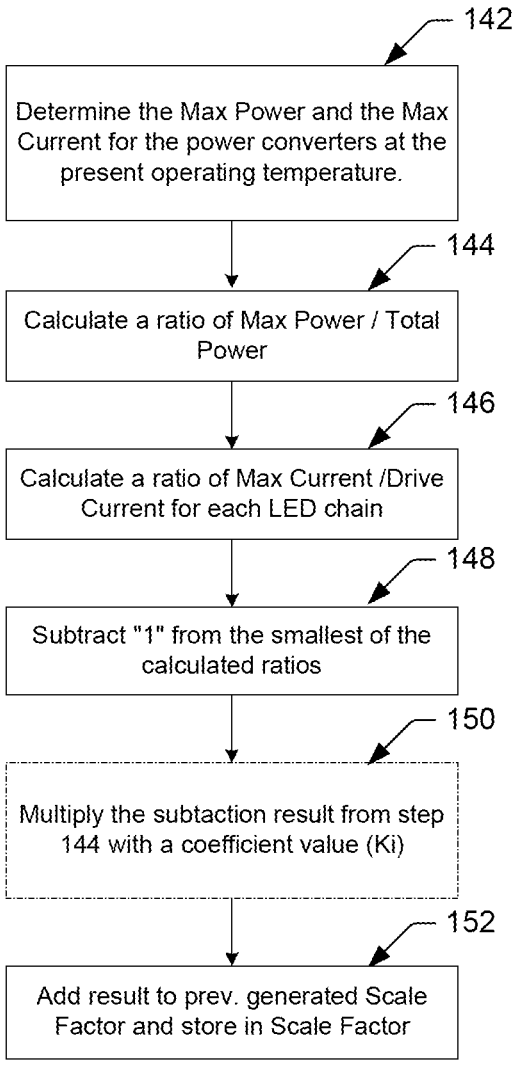

Several of the method steps used in FIG. 13B to update the Scale Factor value are similar to the ones used in FIG. 11 to generate the Scale Factor value. For example, FIG. 13B may begin (in step 142) by determining the Max Power and the Max Current attributed to the power converters at the new operating temperature. The Max Power and Max Current may be determined in step 142 in the same manner as described above in step 94 of FIG. 11. In step 144, a ratio of the Max Power (from step 142) over Total Power (from step 138) is calculated for the AC/DC converter 14, similar to step 96 of FIG. 11. In step 146, a ratio of the Max Current (from step 142) over the Drive Current determined for each LED chain (in step 134) is calculated for each of the DC/DC converters 32, similar to step 98 of FIG. 11. However, the similarities between FIGS. 11 and 13B end here.

In step 148 of FIG. 13B, "1" is subtracted from the smallest of the ratios calculated in steps 144 and 146 and the result of such subtraction is used to generate a new or updated Scale Factor value. In some embodiments, the subtraction result from step 148 is added to a previously generated Scale Factor value to produce a new Scale Factor value, which is stored (in step 152). Depending on the brightness setting and the present operating temperature, the subtraction result from step 148 may be a positive value (which increases the Scale Factor value) or a negative value (which decreases the Scale Factor value).

As long as the brightness setting is small enough (e.g., roughly 50% or less), all Drive Currents determined in step 134 and the Total Power calculated in step 138 will be less than their maximum safe levels at the present operating temperature. When this occurs, the smallest of the ratios calculated in steps 144 and 146 will be some value greater than "1." After "1" is subtracted from this value in step 148, a positive result is added to the previously generated Scale Factor to generate a new Scale Factor value, which gradually increases towards "1," until it is clipped at 1. On the other hand, if the brightness setting and operating temperature are both high, at least one of the Drive Currents or the Total Power will exceed its maximum safe level, resulting in at least one ratio (from steps 144 or 146) that is less than "1." When "1" is subtracted from this ratio (in step 148), a negative result is added to the previously generated Scale Factor to generate a new Scale Factor value, which gradually decreases away from "1."

In some embodiments, the new Scale Factor value is used to calculate a new Target Lumens value (in step 154 of FIG. 13A) according to the equation provided above. As expected, increasing Scale Factor values increase the Target Lumens value, and thus, increase the drive currents supplied to the LED chains, the Total Power drawn by all LED chains, and eventually the operating temperature. Decreasing Scale Factor values have the opposite effect.

In some embodiments, the drive currents supplied to the LED chains (in step 136) may be adjusted to achieve the new Target Lumens value (in step 156). The illumination device may produce illumination at the new drive current levels, and the method may return to step 50 of FIG. 6 to monitor and detect changes in lamp settings. In other embodiments, one or more of the compensation methods described in co-pending application Ser. Nos. 14/314,530; 14/314,580; and 14/471,081 may be performed to fine tune the drive currents before the adjusted drive currents are supplied to the LED chains (in step 156). The method shown in FIG. 13A is assumed to include all such embodiments.

In some embodiments, the positive or negative subtraction result from step 148 of FIG. 14 may be scaled by a coefficient value (Ki) (in optional step 150) before the result is added to the previously generated Scale Factor to generate a new Scale Factor value (in step 152). The coefficient value (Ki) is typically much less than "1" and may be used, in some embodiments, to ensure that the control loop shown in FIG. 13 responds much faster than temperature changes. In optional step 150, the positive or negative subtraction result from step 148 is multiplied by the coefficient value (Ki) and the multiplication result is added to the previously generated Scale Factor to generate the new Scale Factor value. The new Scale Factor value may be stored (in step 152) and applied to the Target Lumens value (in step 154), as described above.

It will be appreciated to those skilled in the art having the benefit of this disclosure that this invention is believed to provide an improved illumination device and improved methods for avoiding an over-power or over-current condition in a power converter. Specifically, illumination devices and methods are provided herein for adjusting the drive currents supplied to the LED chains, so as not to exceed a maximum safe power level or a maximum safe current level attributed to one or more power converters included within the illumination device. Further modifications and alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than a restrictive sense.

What is claimed is:

[1. An illumination device, comprising:

a plurality of light emitting diode (LED) chains configured to produce illumination for the illumination device;

a driver circuit coupled for generating and supplying a respective drive current to each of the plurality of LED chains;

at least one power converter coupled for supplying power to the driver circuit, wherein the at least one power converter comprises a maximum safe current level or a maximum safe power level, which varies with temperature;

a temperature sensor coupled for measuring a present temperature associated with the at least one power converter; and a control circuit coupled to the temperature sensor and the driver circuit, wherein the control circuit is configured for:

determining the maximum safe current level or the maximum safe power level of the at least one power converter at the present temperature; and adjusting the respective drive currents supplied to the plurality of LED chains, so as not to exceed the maximum safe current level or the maximum safe power level at the present temperature;

an interface coupled for receiving a chromaticity setting, and wherein the control circuit is further configured for determining a maximum lumens value that can be safely produced by all LED chains at a predetermined safe temperature to achieve the chromaticity setting; and wherein the interface is further coupled for receiving a brightness setting, and wherein the control circuit is further configured for determining a target lumens value that can be safely produced by all LED chains at the present temperature to achieve the chromaticity setting without exceeding the maximum safe current level or the maximum safe power level associated with the at least one power converter.]

[2. The illumination device as recited in claim 1, wherein the control circuit is configured to determine the maximum lumens value by:

determining, for each LED chain, a lumen proportion needed from each LED chain to achieve the chromaticity setting at the predetermined safe temperature;

determining, for each LED chain, a relative lumens needed from the LED chain to achieve the lumen proportion determined for the LED chain, assuming only one of the plurality of LED chains is driven with a maximum drive current;

calculating, for each LED chain, a ratio of the relative lumens determined for the LED chain over a maximum lumen output for the LED chain;

determining, for each LED chain, an actual lumens needed from the LED chain to achieve the chromaticity setting at the predetermined safe temperature by dividing the relative lumens needed from the LED chain by a largest of the calculated ratios; and summing the actual lumens needed from each LED chain to determine the maximum lumens value that can be produced by all LED chains at the predetermined safe temperature to achieve the chromaticity setting.]

[3. The illumination device as recited in claim 2, wherein the control circuit is configured to determine the lumen proportions needed from each LED chain to achieve the chromaticity setting at the predetermined safe temperature by:

determining, for each LED chain, chromaticity values that are expected for the LED chain using a forward voltage calibrated for the LED chain at the predetermined safe temperature, the respective drive current supplied to the LED chain, a table of stored calibration values correlating forward voltage and drive current to chromaticity at a plurality of different temperatures, and one or more interpolation techniques; and calculating the lumen proportions needed from each LED chain to achieve the chromaticity setting at the predetermined safe temperature using the expected chromaticity values.]

[4. The illumination device as recited in claim 2, wherein the at least one power converter comprises a first power converter coupled for supplying a DC voltage to a plurality of second power converters, each of which are coupled for producing a forward voltage on a respective one of the LED chains, and wherein the maximum safe power level of the first power converter and the maximum safe current levels of the second power converters varies with temperature above the predetermined safe temperature.]

[5. The illumination device as recited in claim 4, wherein the control circuit is further configured to determine the maximum lumens value by:

determining, for each LED chain, a drive current needed to produce the actual lumens needed from the LED chain to achieve the chromaticity setting at the predetermined safe temperature;

estimating a total power drawn by all LED chains combined at the predetermined safe temperature;

determining the maximum safe power level and the maximum safe current level of the power converters at the predetermined safe temperature;

calculating a ratio of the maximum safe power level at the predetermined safe temperature over the total power estimated at the predetermined safe temperature;

calculating, for each LED chain, a ratio of the maximum safe current level at the predetermined safe temperature over the drive current determined for the LED chain at the predetermined safe temperature;

using a smallest of the calculated ratios to generate a scale factor; and applying the scale factor to the maximum lumens value.]

[6. The illumination device as recited in claim 1, wherein the control circuit is configured to determine the target lumens value by:

applying the brightness setting to the maximum lumens value to generate a temporary target lumens value;

determining, for each LED chain, an actual lumens needed from the LED chain to achieve the temporary target lumens value at the present temperature;

determining, for each LED chain, a drive current needed to produce the actual lumens at the present temperature;

estimating a total power drawn by all LED chains combined at the present temperature;

calculating a ratio of the maximum safe power level determined at the present temperature over the total power estimated at the present temperature;

calculating, for each LED chain, a ratio of the maximum safe current level determined at the present temperature over the drive current determined for the LED chain at the present temperature;

using a smallest of the calculated ratios to generate a scale factor; and calculating the target lumens value by applying the scale factor and the brightness setting to the maximum lumens value.]

[7. The illumination device as recited in claim 6, wherein the control circuit is configured to determine the actual lumens needed from each LED chain to achieve the temporary target lumens value at the present temperature by:

periodically turning the plurality of LED chains off for short durations of time;

measuring a forward voltage presently developed across each LED chain by applying a non-operative drive current to each LED chain, one chain at a time, during the short durations of time the plurality of LED chains are periodically turned off;

determining chromaticity values that are expected for each LED chain using the forward voltage measured across each LED chain, the respective drive current supplied to each LED chain, a table of stored calibration values correlating forward voltage and drive current to chromaticity at a plurality of different temperatures, and one or more interpolation techniques; and calculating the actual lumens needed from each LED chain to achieve the temporary target lumens value using the expected chromaticity values and the chromaticity setting.]

[8. The illumination device as recited in claim 6, wherein the control circuit is configured for adjusting the respective drive currents supplied to the plurality of LED chains, so as to achieve the target lumens value.]

[9. The illumination device as recited in claim 6, wherein the control circuit is configured for periodically readjusting the respective drive currents supplied to the plurality of LED chains to account for changes in the present temperature by:

measuring a new present temperature;

determining, for each LED chain, an actual lumens needed from the LED chain to achieve the chromaticity setting and the target lumens value at the new present temperature;

determining, for each LED chain, a drive current needed to produce the actual lumens at the new present temperature;

applying the determined drive currents to the LED chains;

determining a total power drawn by all LED chains combined at the new present temperature;

updating the scale factor to account for changes in the maximum safe power level and/or the maximum safe current level of the power converters at the new present temperature;

recalculating the target lumens value using the updated scale factor; and adjusting the respective drive currents supplied to the plurality of LED chains, so as to achieve the recalculated target lumens value.]

[10. The illumination device as recited in claim 9, wherein the control circuit is configured for updating the scale factor by:

determining the maximum safe power level and the maximum safe current level of the power converters at the new present temperature;

calculating a ratio of the maximum safe power level at the new present temperature over the total power determined at the new present temperature;

calculating, for each LED chain, a ratio of the maximum safe current level at the new present temperature over the drive current determined for the LED chain;

subtracting 1 from a smallest of the calculated ratios to generate a subtraction result; and adding the subtraction result to the scale factor to update the scale factor.]

[11. The illumination device as recited in claim 9, wherein the control circuit is configured for updating the scale factor by:

determining the maximum safe power level and the maximum safe current level of the power converters at the new present temperature;

calculating a ratio of the maximum safe power level at the new present temperature over the total power determined at the new present temperature;

calculating, for each LED chain, a ratio of the maximum safe current level at the new present temperature over the drive current determined for the LED chain;

subtracting 1 from a smallest of the calculated ratios to generate a subtraction result;

multiplying the subtraction result with a coefficient value to generate a multiplication result; and adding the multiplication result to the scale factor to update the scale factor.]

[12. A method for controlling a lumen output of an illumination device comprising a plurality of light emitting diode (LED) chains and a plurality of power converters, so as not to exceed a maximum safe power level and a maximum safe current level of the power converters at a present temperature, the method comprising:

measuring a present temperature associated with the at least one power converter;

determining the maximum safe current level and the maximum safe power level of the power converters at the present temperature; and adjusting drive currents supplied to each of the plurality of LED chains, so as not to exceed the maximum safe current level and the maximum safe power level at the present temperature;

receiving a chromaticity setting and a brightness setting for the illumination device;

determining a maximum lumens value that can be safely produced by all LED chains at a predetermined safe temperature to achieve the chromaticity setting; and determining a target lumens value that can be safely produced by all LED chains at the present temperature to achieve the chromaticity setting without exceeding the maximum safe current level or the maximum safe power level associated with the power converters.]

[13. The method as recited in claim 12, wherein said determining a maximum lumens value comprises:

determining, for each LED chain, a lumen proportion needed from each LED chain to achieve the chromaticity setting at the predetermined safe temperature;

determining, for each LED chain, a relative lumens needed from the LED chain to achieve the lumen proportion determined for the LED chain, assuming only one of the plurality of LED chains is driven with a maximum drive current;

calculating, for each LED chain, a ratio of the relative lumens determined for the LED chain over a maximum lumen output for the LED chain;

determining, for each LED chain, an actual lumens needed from the LED chain to achieve the chromaticity setting at the predetermined safe temperature by dividing the relative lumens needed from the LED chain by a largest of the calculated ratios; and summing the actual lumens needed from each LED chain to determine the maximum lumens value that can be safely produced by all LED chains at the predetermined safe temperature to achieve the chromaticity setting.]

[14. The method as recited in claim 13, wherein said determining the lumen proportions needed from each LED chain to achieve the chromaticity setting at the predetermined safe temperature comprises:

determining, for each LED chain, chromaticity values that are expected for the LED chain using a forward voltage calibrated for the LED chain at the predetermined safe temperature, the drive current supplied to the LED chain, a table of stored calibration values correlating forward voltage and drive current to chromaticity at a plurality of different temperatures, and one or more interpolation techniques; and calculating the lumen proportions needed from each LED chain to achieve the chromaticity setting at the predetermined safe temperature using the expected chromaticity values.]

[15. The method as recited in claim 13, wherein said determining a maximum lumens value further comprises:

determining, for each LED chain, a drive current needed to produce the actual lumens needed from the LED chain to achieve the chromaticity setting at the predetermined safe temperature;

estimating a total power drawn by all LED chains combined at the predetermined safe temperature;

determining the maximum safe power level and the maximum safe current level of the power converters at the predetermined safe temperature;

calculating a ratio of the maximum safe power level at the predetermined safe temperature over the estimated total power;

calculating, for each LED chain, a ratio of the maximum safe current level at the predetermined safe temperature over the drive current determined for the LED chain;

using a smallest of the calculated ratios to generate a scale factor; and applying the scale factor to the maximum lumens value.]

[16. The method as recited in claim 12, wherein said determining a target lumens value comprises:

applying the brightness setting to the maximum lumens value to generate a temporary target lumens value;

determining, for each LED chain, an actual lumens needed from the LED chain to achieve the temporary target lumens value at the present temperature;

determining, for each LED chain, a drive current needed to produce the actual lumens at the present temperature;

estimating a total power drawn by all LED chains combined at the present temperature;

calculating a ratio of the maximum safe power level determined at the present temperature over the total power estimated at the present temperature;

calculating, for each LED chain, a ratio of the maximum safe current level determined at the present temperature over the drive current determined for the LED chain at the present temperature;

using a smallest of the calculated ratios to generate a scale factor; and calculating the target lumens value by applying the scale factor and the brightness setting to the maximum lumens value.]

[17. The method as recited in claim 16, wherein said determining the actual lumens needed from each LED chain to achieve the temporary target lumens value at the present temperature comprises:

periodically turning the plurality of LED chains off for short durations of time;

measuring a forward voltage presently developed across each LED chain by applying a non-operative drive current to each LED chain, one chain at a time, during the short durations of time the plurality of LED chains are periodically turned off;

determining chromaticity values that are expected for each LED chain using the forward voltage measured across each LED chain, the drive current supplied to each LED chain, a table of stored calibration values correlating forward voltage and drive current to chromaticity at a plurality of different temperatures, and one or more interpolation techniques; and calculating the actual lumens needed from each LED chain to achieve the temporary target lumens value using the expected chromaticity values and the chromaticity setting.]

[18. The method as recited in claim 16, further comprising adjusting the drive currents supplied to the plurality of LED chains, so as to achieve the target lumens value.]

[19. The method as recited in claim 16, further comprising periodically readjusting the drive currents supplied to the plurality of LED chains to account for changes in the present temperature by:

measuring a new present temperature;

determining, for each LED chain, an actual lumens needed from the LED chain to achieve the chromaticity setting and the target lumens value at the new present temperature;

determining, for each LED chain, a drive current needed to produce the actual lumens at the new present temperature;

applying the determined drive currents to the LED chains;

determining a total power drawn by all LED chains combined at the new present temperature;

updating the scale factor to account for changes in the maximum safe power level and/or the maximum safe current level of the power converters at the new present temperature;

recalculating the target lumens value using the updated scale factor; and adjusting the drive currents supplied to the plurality of LED chains, so as to achieve the recalculated target lumens value.]

[20. The method as recited in claim 19, wherein said updating the scale factor comprises:

determining the maximum safe power level and the maximum safe current level of the power converters at the new present temperature;

calculating a ratio of the maximum safe power level determined at the new present temperature over the total power determined at the new present temperature;

calculating, for each LED chain, a ratio of the maximum safe current level determined at the new present temperature over the drive current determined for the LED chain at the new present temperature;

subtracting 1 from a smallest of the calculated ratios to generate a subtraction result; and adding the subtraction result to the scale factor to update the scale factor.]

[21. The method as recited in claim 19, wherein said updating the scale factor comprises:

determining the maximum safe power level and the maximum safe current level of the power converters at the new present temperature;

calculating a ratio of the maximum safe power level determined at the new present temperature over the total power determined at the new present temperature;

calculating, for each LED chain, a ratio of the maximum safe current level determined at the new present temperature over the drive current determined for the LED chain at the new present temperature;

subtracting 1 from a smallest of the calculated ratios to generate a subtraction result;

multiplying the subtraction result with a coefficient value to generate a multiplication result; and adding the multiplication result to the scale factor to update the scale factor.]

*22. A controller for an illumination device, the controller comprising:*

*a control circuit coupled to one or more light-emitting diode (LED) drive circuits and to one or more power converter circuits the control circuit configured to:*

*receive a target chromaticity setting and a target brightness setting;*

*receive data representative of a current operating temperature of the illumination device;*

*determine a scale factor to be applied to respective drive currents provided by the one or more LED drive circuits to each of a plurality of LED chains to achieve the target chromaticity setting at the current operating temperature of the illumination device:*

*without exceeding a maximum current level of the one or more LED drive circuits; and*

*without exceeding a maximum safe power level of the one or more power converter circuits;*

*determine a maximum lumens value that can be produced using the plurality of LED chains at a defined temperature to achieve the target chromaticity setting;*

*determine, using the determined maximum lumens value and the determined scale factor, a target lumens value that can be produced using the plurality of LED chains at the current operating temperature of the illumination device to achieve the target chromaticity setting without exceeding the maximum current level of the one or more LED drive circuits and without exceeding a maximum safe power level of one or more power converter circuits; and*

*adjust the respective drive currents supplied to the plurality of LED chains to achieve the target lumens value.*

*23. The controller of claim 22, wherein to determine, using the determined maximum lumens value and the determined scale factor, the target lumens value that can be produced using the plurality of LED chains, the control circuit to further:*

*determine the target lumens value by multiplying the determined maximum lumens value by the determined scale factor and the received target brightness setting.*

*24. The controller of claim 22, wherein to determine the maximum lumens value that can be produced using the plurality of LED chains at the defined temperature to achieve the target chromaticity setting, the control circuit to further:*

*determine the maximum lumens value that can be produced using the plurality of LED chains to achieve the target chromaticity setting at a defined safe operating temperature of the illumination device.*

*25. The controller of claim 22, the control circuit to further:*

*determine the maximum current level for the one or more LED drive circuits using the current operating temperature of the illumination device;*

*determine a drive current level for at least one of the plurality of LED chains for generating the maximum lumens value; and*

*determine the scale factor based on the maximum current level and the drive current level for the at least one of the plurality of LED chains.*

*26. The controller of claim 25, the control circuit to further:*

*determine the scale factor by dividing the maximum current level by the drive current level for the at least one of the plurality of LED chains.*

*27. The controller of claim 22, the control circuit to further:*

*determine, at the current operating temperature, a respective scale factor for each of the drive currents supplied to each of the plurality of LED chains to achieve the target chromaticity setting for the illumination device without exceeding the maximum current level of the one or more LED drive circuits and a maximum power level of a power converter circuitry operatively coupled to the one or more LED drive circuits.*

*28. The controller of claim 27, the control to further:*

*determine the maximum power level of the power converter circuitry at the current operating temperature;*

*determine a total power level for the power converter circuitry at the determined maximum lumens value; and*

*determine the scale factor based on the determined maximum power level and the determined total power level.*

*29. The controller of claim 28, the control circuit to further:*

*determine the scale factor by dividing the determined maximum power level by the determined total power level.*

*30. A method of determining a target chromaticity for an illumination device that includes one or more light-emitting diode drive circuits coupled to one or more power converter circuits, the method comprising:*

*receiving, by an LED illumination fixture control circuit, a target chromaticity setting and a target brightness setting;*

*receiving, by the LED illumination fixture control circuit, data representative of a current operating temperature of the illumination device;*

*determining, by the LED illumination fixture control circuit, a scale factor to be applied to respective drive currents provided by the one or more LED drive circuits to each of a plurality of LED chains to achieve the target chromaticity setting at the current operating temperature of the illumination device:*

*without exceeding a maximum current level of the one or more LED drive circuits; and*

*without exceeding a maximum safe power level of the one or more power converter circuits;*

*determining, by the LED illumination fixture control circuit, a maximum lumens value that can be produced using the plurality of LED chains at a defined temperature to achieve the target chromaticity setting;*

*determining, by the LED illumination fixture control circuit using the determined maximum lumens value and the determined scale factor, a target lumens value that can be produced using the plurality of LED chains at the current operating temperature of the illumination device to achieve the target chromaticity setting without exceeding the maximum current level of the one or more LED drive circuits and without exceeding a maximum safe power level of one or more power converter circuits; and*

*causing, by the LED illumination fixture control circuit, the one or more LED drive circuits to adjust the respective drive currents supplied to the plurality of LED chains to achieve the target lumens value.*

*31. The method of claim 30, wherein determining, using the determined maximum lumens value and the determined scale factor, the target lumens value that can be produced using the plurality of LED chains, further comprises:*

*determining, by the LED illumination fixture control circuit, the target lumens value by multiplying the determined maximum lumens value by the determined scale factor and the received target brightness setting.*

*32. The method of claim 30, wherein determining the maximum lumens value that can be produced using the plurality of LED chains at the defined temperature to achieve the target chromaticity setting, further comprises:*

*determining, by the LED illumination fixture control circuit, the maximum lumens value that can be produced using the plurality of LED chains to achieve the target chromaticity setting at a defined safe operating temperature of the illumination device.*

*33. The method of claim 30, further comprising:*

*determining, by the LED illumination fixture control circuit, the maximum current level for the one or more LED drive circuits using the current operating temperature of the illumination device;*

*determining, by the LED illumination fixture control circuit, a drive current level for at least one of the plurality of LED chains for generating the maximum lumens value; and*

*determining, by the LED illumination fixture control circuit, the scale factor based on the maximum current level and the drive current level for the at least one of the plurality of LED chains.*

*34. The method of claim 33, further comprising:*

*determining, by the LED illumination fixture control circuit, the scale factor by dividing the maximum current level by the drive current level for the at least one of the plurality of LED chains.*

*35. The method of claim 30, further comprising:*

*determining, by the LED illumination fixture control circuit, a respective scale factor for each of the drive currents supplied to each of the plurality of LED chains to achieve the target chromaticity setting for the illumination device without exceeding the maximum current level of the one or more LED drive circuits and a maximum power level of a power converter circuitry operatively coupled to the one or more LED drive circuits.*

*36. The method of claim 35, further comprising:*

*determining, by the LED illumination fixture control circuit, the maximum power level of the power converter circuitry at the current operating temperature;*

*determining, by the LED illumination fixture control circuit, a total power level for the power converter circuitry at the determined maximum lumens value; and*

*determining, by the LED illumination fixture control circuit, the scale factor based on the determined maximum power level and the determined total power level.*

*37. The method of claim 36, further comprising:*

*determining, by the LED illumination fixture control circuit, the scale factor by dividing the determined maximum power level by the determined total power level.*

*38. A non-transitory, machine-readable, storage device that included instructions that when executed by an LED device control circuit coupled to one or more light-emitting diode drive circuits and one or more power converter circuits, causes the control circuit to:*

*receive a target chromaticity setting and a target brightness setting;*

*receive data representative of a current operating temperature of the illumination device;*

*determine a scale factor to be applied to respective drive currents provided by the one or more LED drive circuits to each of a plurality of LED chains to achieve the target chromaticity setting at the current operating temperature of the illumination device:*

*without exceeding a maximum current level of the one or more LED drive circuits; and*

*without exceeding a maximum safe power level of the one or more power converter circuits;*

*determine a maximum lumens value that can be produced using the plurality of LED chains at a defined temperature to achieve the target chromaticity setting;*

*determine, using the determined maximum lumens value and the determined scale factor, a target lumens value that can be produced using the plurality of LED chains at the current operating temperature of the illumination device to achieve the target chromaticity setting without exceeding the maximum current level of the one or more LED drive circuits and without exceeding a maximum safe power level of one or more power converter circuits; and*

*cause the one or more LED drive circuits to adjust the respective drive currents supplied to the plurality of LED chains to achieve the target lumens value.*

*39. The non-transitory, machine-readable, storage device of claim 38, wherein the instructions that cause the control circuit to determine, using the determined maximum lumens value and the determined scale factor, the target lumens value that can be produced using the plurality of LED chains, further cause the control circuit to:*

*determine the target lumens value by multiplying the determined maximum lumens value by the determined scale factor and the received target brightness setting.*

*40. The non-transitory, machine-readable, storage device of claim 38, wherein the instructions that cause the control circuit to determine the maximum lumens value that can be produced using the plurality of LED chains at the defined temperature to achieve the target chromaticity setting, further cause the control circuit to:*

*determine the maximum lumens value that can be produced using the plurality of LED chains to achieve the target chromaticity setting at a defined safe operating temperature of the illumination device.*

*41. The non-transitory, machine-readable, storage device of claim 38, wherein the instructions, when executed by the control circuit, cause the control circuit to further:*

*determine the maximum current level for the one or more LED drive circuits using the current operating temperature of the illumination device;*

*determine a drive current level for at least one of the plurality of LED chains for generating the maximum lumens value; and*

*determine the scale factor based on the maximum current level and the drive current level for the at least one of the plurality of LED chains.*

*42. The non-transitory, machine-readable, storage device of claim 41, wherein the instructions, when executed by the control circuit, cause the control circuit to further:*

*determine the scale factor by dividing the maximum current level by the drive current level for the at least one of the plurality of LED chains.*

*43. The non-transitory, machine-readable, storage device of claim 38, wherein the instructions, when executed by the control circuit, cause the control circuit to further:*

*determine a respective scale factor for each of the drive currents supplied to each of the plurality of LED chains to achieve the target chromaticity setting for the illumination device without exceeding the maximum current level of the one or more LED drive circuits and a maximum power level of a power converter circuitry operatively coupled to the one or more LED drive circuits.*

*44. The non-transitory, machine-readable, storage device of claim 43, wherein the instructions, when executed by the control circuit, cause the control circuit to further:*

*determine the maximum power level of the power converter circuitry at the current operating temperature;*

*determine a total power level for the power converter circuitry at the determined maximum lumens value; and*

*determine the scale factor based on the determined maximum power level and the determined total power level.*

*45. The non-transitory, machine-readable, storage device of claim 44, wherein the instructions, when executed by the control circuit, cause the control circuit to further:*

*determine the scale factor by dividing the determined maximum power level by the determined total power level.*

* * * * *